(12) United States Patent
McKinney et al.

(10) Patent No.: US 12,491,227 B2
(45) Date of Patent: Dec. 9, 2025

(54) CRILA® AND EGCG COMPOSITIONS FOR TREATMENT OF FIBROIDS

(71) Applicant: Altin Biosciences Corporation, Emeryville, CA (US)

(72) Inventors: Charlotte Sue McKinney, Mendocino, CA (US); Adam Joshua Payne, Edmond, OK (US)

(73) Assignee: Altin Biosciences Corporation, Emeryville, CA (US)

( * ) Notice: Subject to any disclaimer, the term of this patent is extended or adjusted under 35 U.S.C. 154(b) by 0 days.

(21) Appl. No.: 18/115,690

(22) Filed: Feb. 28, 2023

(65) Prior Publication Data
US 2024/0139274 A1 May 2, 2024

Related U.S. Application Data

(60) Provisional application No. 63/315,101, filed on Mar. 1, 2022.

(51) Int. Cl.
| | |
|---|---|
| *A61K 36/896* | (2006.01) |
| *A61K 9/48* | (2006.01) |
| *A61K 31/353* | (2006.01) |
| *A61P 15/02* | (2006.01) |
| *A61P 35/00* | (2006.01) |

(52) U.S. Cl.
CPC ............. *A61K 36/896* (2013.01); *A61K 9/48* (2013.01); *A61K 31/353* (2013.01); *A61P 15/02* (2018.01); *A61P 35/00* (2018.01)

(58) Field of Classification Search
CPC ........................... A61K 36/896; A61K 31/353
See application file for complete search history.

(56) References Cited

FOREIGN PATENT DOCUMENTS

KR 10-1873159 B1 † 6/2018

OTHER PUBLICATIONS

Gasca-Silva et al.; "Recent updates on *Crinum latifolium* L. (Amaryllidaceae): A review of ethnobotanical, physiochemical, and biological properties"; 2022; South African Journal of Botany; 146: 162-173 (Year: 2022).*

Thien DuocPharma JSC; "Crila®"; 2020; https://www.thienduoc.com/en-US/products/crila-1; accessed Jun. 1, 2022 (Year: 2020).*

Roshdy et al.; "Treatment of symptomatic uterine fibroids with green tea extract: a pilot randomized controlled clinical study"; 2013; International Journal of Women's Health; 5: 477-486 (Year: 2013).*

E. Zvetkova et al, Aqueous extracts of *Crinum latifolium* (L) and *Camellia sinensis* show immunomodulatory properties . . . International Immunopharmacology, 1, 2001, 2143-2150.

(Continued)

*Primary Examiner* — Timothy P Thomas
(74) *Attorney, Agent, or Firm* — Sam Tahmassebi

(57) ABSTRACT

In one embodiment, the present application discloses, in part, biologically active compositions comprising a Crila® composition, or an admixture of *Crinum latifolium* L. dry extract (Crila®) and epigallocatechin gallate (EGCG), wherein the ratio of the *Crinum latifolium* L. dry extract to EGCG, and their use in the treatment of intramural or subserosal fibroids and various related diseases.

9 Claims, 14 Drawing Sheets

Specification includes a Sequence Listing.

(56) References Cited

OTHER PUBLICATIONS

D. Zhang et al, Gree tea extract inhibits proliferation of uterine leiomyoma cells in vitro and in nude mice, Am. J. Obstet Gynecol, 2010; 202:289.e1-9.
E. Roshdy et al, Treatment of symptomatic uterine fibroids with green tea extract: a pilot randomized controlled clinical study, Intern. J. of Women's Health, 2013:5 477-486.
M. Jenny et al, Crinum Latifolium Leave Extraccts Suppress Immune Activation Cascades in Peripheral Blood Mononuclear Cells and Proliferaiton of . . . , Sci Pharm 2011; 79:323-335.
Tao Bai, et al., "The Combination of natural compounds Crila and epigallocatechin gallate showed enhanced antiproliferative effects on human uterine fibroid cells compared with single treatments," Fertil Steril Sci, vol. 4, No. 4, pp. 341-349, Nov. 2023.
Fennell and Staden. "Crinum species in traditional and modern medicine", Journal of Ethnopharmacology, 78 (20021) 15-26.
Anonymous; Crinum Latifolium controls prostate enlargement and uterine fibroids-Thien Due, Dec. 16, 2021; from Internet: https://www.thienduoc.com/en-US/news/thien-duoc-news/press-news/crinum-latifolium-controls-prostate-enlargement-and-uterine-fibroids, 5 pages.
Fennell et al., "Crinum species in traditional and modern medicine," Journal of Ethnopharmacology, 78(1), Nov. 2001, 15-26.†

\* cited by examiner
† cited by third party

Separate Experiment 1:

Separate Experiment 2:

SEQUENCE LISTING

```
Sequence total quantity: 6
SEQ ID NO: 1              moltype = DNA  length = 22
FEATURE                   Location/Qualifiers
source                    1..22
                          mol_type = other DNA
                          organism = synthetic construct
SEQUENCE: 1
gcaagtggag aacttggaaa tg                                                  22

SEQ ID NO: 2              moltype = DNA  length = 23
FEATURE                   Location/Qualifiers
source                    1..23
                          mol_type = other DNA
                          organism = synthetic construct
SEQUENCE: 2
gcctaagatc cttcttcatc ctc                                                 23

SEQ ID NO: 3              moltype = DNA  length = 19
FEATURE                   Location/Qualifiers
source                    1..19
                          mol_type = other DNA
                          organism = synthetic construct
SEQUENCE: 3
ccccgagagg tcttttcc                                                       19

SEQ ID NO: 4              moltype = DNA  length = 20
FEATURE                   Location/Qualifiers
source                    1..20
                          mol_type = other DNA
                          organism = synthetic construct
SEQUENCE: 4
tgtccagccc atgatggttc                                                     20

SEQ ID NO: 5              moltype = DNA  length = 20
FEATURE                   Location/Qualifiers
source                    1..20
                          mol_type = other DNA
                          organism = synthetic construct
SEQUENCE: 5
gacagtcagc cgcatcttct                                                     20

SEQ ID NO: 6              moltype = DNA  length = 20
FEATURE                   Location/Qualifiers
source                    1..20
                          mol_type = other DNA
                          organism = synthetic construct
SEQUENCE: 6
gcgcccaata cgaccaaatc                                                     20
```

CRILA® AND EGCG COMPOSITIONS FOR TREATMENT OF FIBROIDS

CROSS REFERENCE TO RELATED APPLICATIONS

This application claims priority to and the benefit of U.S. Provisional Patent Application No. 63/315,101, filed on Mar. 1, 2022, which is incorporated herein by reference in its entirety.

REFERENCE TO ELECTRONIC SEQUENCE LISTING

The application contains a Sequence Listing which has been submitted electronically in .XML format and is hereby incorporated by reference in its entirety. Said .XML copy, created on Oct. 9, 2025, is named "ALTIN001US1.xml" and is 6,390 bytes in size. The sequence listing contained in this .XML file is part of the specification and is hereby incorporated by reference herein in its entirety.

FIELD OF INVENTION

The present invention relates to biologically active compositions and formulations, and combinations thereof, for the treatment of fibroids and diseases associated with intramural and submucosal fibroids.

BACKGROUND OF THE INVENTION

Uterine leiomyomas (fibroids) affect 30-50% of reproductive-age women and are a significant cause of infertility. Intramural and submucosal fibroids reduce the likelihood of pregnancy (RR=0.3-0.7) compared to unaffected women.

Surgical removal of fibroids can restore fertility; however, recurrence rates are high, and benefits are often temporary. Serious postoperative consequences such as adhesions can adversely affect a woman's fertility and health in general. Hysterectomy (i.e., surgical removal of the uterus) is a common treatment for fibroids, and are indicated in up to one third of all cases. Hysterectomy for treating fibroids may be very effective but has many undesirable side effects such as loss of fertility, open surgery, sexual dysfunction and long recovery time. There is also significant morbidity (e.g., sepsis, hemorrhage, peritonitis, bowel and bladder injury), mortality and costs associated with hysterectomy treatments. Other invasive procedures for the treatment of fibroids include surgical myomectomy, such as laparoscopic myomectomy, hysteroscopy (i.e., process by which a thin fiber optic camera is used to image inside the uterus), uterine artery embolization, endometrial ablation, myolysis and needle myolysis.

Hormonal therapies that induce medical menopause can be used to reduce fibroid size, but these therapies also prevent pregnancy. Current treatment for fibroids includes medical treatment with NSAIDS, estrogen-progesterone combinations and GnRH analogues. Pharmacologic therapy with GnRH analogues is limited due to its side effects, such as hot flashes, vaginal dryness, mood changes and bone density loss. Pharmacologic therapy is relatively ineffective and palliative rather than curative. U.S. Pat. No. 10,155,004 discloses methods for the treatment of fibroid of the uterus, among other diseases, comprising the administering of an estra-4,9-dien-3-one derivative. U.S. Pat. No. 5,472,977 discloses a method for inhibiting uterine fibroid disease comprising administering various substituted triphenyl dropyran derivatives.

*Crinum latifolium* has had widespread use in Asian folk and traditional medicine (Vietnamese, Ayurvedic, Chinese) as a tonic and for inflammation, infection, allergic disorders and tumors. See Tram, N. T. N. et al., *Crinum* L. (Amaryllidaceae). Fitoterapia 2002, 73(3), 183-208; Gasca-Silva, C. A. et al., Recent updates on *Crinum latifolium* L. (Amaryllidaceae): A review of ethnobotanical, phytochemical, and biological properties. *South African Journal of Botany* 2022, 146, 162-173.

Several in vitro studies on *C. latifolium* have been published. See Jenny, M. Et al., *Crinum latifolium* leave extracts suppress immune activation cascades in peripheral blood mononuclear cells and proliferation of prostate tumor cells. *Scientia pharmaceutica* 2011, 79 (2), 323-336. One study demonstrated that aqueous extracts have immunomodulatory properties in human peripheral blood mononuclear cells. See Zvetkova, E. Et al., Aqueous extracts of *Crinum latifolium* (L.) and *Camellia sinensis* show immunomodulatory properties in human peripheral blood mononuclear cells. *International immunopharmacology* 2001, 1 (12), 2143-2150.

The plant had a long tradition of use for the treatment of several ailments, including prostate problems in men and reproductive organ problems in women, but there was no data confirming the ethnobotanical use of the herb. It has been determined that of 12 subspecies of *Crinum*, certain medicinal properties was associated with one subspecies, the specific variety *Crinum latifolium* L. var. crilae Tram & Khanh, which has become the focus of research over the last two decades. The variety was cultivated and propagated, and the processed plant material is now sold internationally under the trade name Crila®.

Crila® contains various phytochemicals such as crinamidine-like compounds and various types of amaryllidaceae alkaloids. It has been demonstrated Crila® has been shown to be used as a non-hormonal therapeutic that can reduce the size of uterine fibroids, reduce the symptoms associated with uterine fibroids, and in some cases restore fertility. See Burton, T. C. Et al. In *Examining the Estrogenicity of Crinum latifolium L. var. crilae Tram & Khanh, var n. (Amaryllidaceae) Using Cell-based and Receptor-based Assays*, MENOPAUSE; The Journal of the North American Menopause Society, Lippincott Williams & Wilkins, 530 Walnut St. Philadelphia, PA 19106-3621 USA: 2014; pp 1335-1335.

Researchers have shown that in vivo, chemically induced tumors in rats that are treated per os with aqueous extracts of *C. latifolium* showed slower growth. See Zvetkova, E. et al., Aqueous extracts of *Crinum latifolium* (L.) and *Camellia sinensis* show immunomodulatory properties in human peripheral blood mononuclear cells. *International immunopharmacology* 2001, 1 (12), 2143-2150. Acute toxicology studies in mice have shown that with levels that were 20, 30, 80 and 100 times the usual human doses, or up to 25 gm/kg per day of dried extract of *C. latifolium*, toxicity has not been detected at 48 hours. The $LD_{50}$ was 49.7 gm/kg. See Yen, H. T. et al., The evaluation of acute and subchronic toxicities of An Phu Khang capsules in experimental animals. Tap chi Nghiên cứu Y học 2021, 148 (12), 86-95. The findings of low toxicity were confirmed in rats, rabbits and dogs and in physiological models. See Zvetkova, E. et al., supra.

Standardized Crila® has been publicly available in Vietnam since 2005 and more recently in the other countries. With the prevalent use of Crila® internationally, there have been no reported adverse events requiring medical care. Standardized formulations of Crila®, imported under FDA "Prior Notice" inspection, have been sold in the U.S. since 2010.

Clinical Trials Using Crila®:

There have been two well-described clinical studies of Crila® for uterine fibroid tumors and benign prostatic hyperplasia (BPH). The BPH study was a single group open label trial completed in 2005 at 3 hospitals in Vietnam with 189 men for 2 months. Of 157 completers, 89.2% showed a beneficial response on the International Prostate Symptom Score (p<. 001), reduced prostate volume (p<. 05) and residual urine (p<. 05). Another three-month study of 195 women suffering from uterine fibroid (leiomyoma) was succesfully conducted in three hospitals in 2007. See Hoa, V. T., To Evaluate the Effect and Possibility of Accepting of Crila in Uterus Fibroid Tumor Treatment. *Vietnam Ministry of Health* 2007.

Crila® decreased the size or stopped the growth of the tumors in 79.5% of the women while tumor growth continued at a slow rate in the others. Mean tumor diameter decreased from 48.5 mm to 44.4 mm (p<. 01). 36% of the women reported heavy menstrual flow before taking Crila® which decreased to 1% after treatment. There were no significant differences between baseline and the study endpoint in the vital signs, liver enzymes, creatinine or leucocytes. Erythrocytes showed a slight rise within the normal range. There were no changes in urinalyses with microscopic examination. Twenty patients (12.73%) experienced possibly attributable mild transient side effects, primarily gastrointestinal (17 subjects), dizziness (4), rash (2) and insomnia (1). In this uterine fibroid open label study (n=195 for 3 months), there were no changes in vitals, nor liver and kidney function or blood cell counts from baseline to last follow-up. The study had 3 assessments after baseline. Side effects reported were included nausea, vomiting, headache, vaginal dryness and hot flashes. These side effects tended to decrease with time and changing administration, and medical intervention was not necessary. Fifteen percent experienced mild nausea at the end of the first 30 days, but this number dropped to 5% at the end of 90 days. Clinical work with Crila® preliminary to the uterine fibroids trial is referred to but not fully described in the report. The preliminary work was in 40 uterine fibroid patients in whom results were cited as "satisfactory".

In 2005, the Vietnamese Ministry of Health approved the use of Crila® in hospitals and pharmacies throughout Vietnam for men suffering from benign prostatic hyperplasia (BPH). And in 2007, the Vietnamese Ministry of Health approved the use of Crila® in hospitals and pharmacies throughout Vietnam for women for uterine leiomyoma.

Epigallocatechin gallate (EGCG):

Green tea leaves contain polyphenols such as catechins or flavin-3-ols that include epicatechin (EC), epigallocatechin (EGC), epigallocatechin gallate (EGCG), and alkaloids. See Singh, B. N. et al., Green tea catechin, epigallocatechin-3-gallate (EGCG): mechanisms, perspectives and clinical applications. *Biochemical pharmacology* 2011, 82 (12), 1807-1821 and Zhang, Y. et al., A review for physiological activities of EGCG and the role in improving fertility in humans/mammals. *Biomedicine & Pharmacotherapy* 2020, 127, 110186. Catechins are the major components of phenols derived from tea and constitute about 30-42% of the dry weight of green tea. Studies have shown that the EGCG catechin is the most abundant and active compound responsible for most of green tea's role in promoting good health and accounts for the favorable research result cited in the medical literature with the use of green tea extracts. EGCG is the most abundant polyphenol and is the primary antioxidant agent in green tea.

A study conducted by the United States Department of Agriculture reported that green gea has potent anti-neoplastic effects against a wide range of human tumor cells and EGCG inhibits key pathways of tumor growth. See Khan, N. et al., Tea polyphenols for health promotion. *Life sciences* 2007, 81 (7), 519-533. EGCG appears to block each stage of tumorigenesis by modulating signaling pathways involved in cell proliferation, transformation, inflammation, apoptosis, oxidative stress and invasion. EGCG polyphenols inhibit key pathways of tumor growth by modulating signaling pathways involved in cell proliferation, transformation, inflammation, apoptosis, metastasis and invasion. See Zhang, D. et al., Green tea extract inhibits proliferation of uterine leiomyoma cells in vitro and in nude mice. *American Journal of Obstetrics and Gynecology* 2010, 202 (3), 289. e1-289. e9.

Al-Hendy et al. demonstrated increasing levels of Catechol-O-methyl transferase (COMT) in uterine leiomyoma compared to adjacent myometrium and described its important role in fibroid pathogenesis. Zhang, D.; Rajaratnam, V.; Al-Hendy, O.; Halder, S.; Al-Hendy, A., Green tea extract inhibition of human leiomyoma cell proliferation is mediated via catechol-O-methyltransferase. *Gynecologic and obstetric investigation* 2014, 78 (2), 109-118. In addition, EGCG was determined to exert a potent COMT inhibitor effect which also contribute to effective anti-fibroid action. See Zhang, D.; Al-Hendy, M.; Richard-Davis, G.; Montgomery-Rice, V.; Rajaratnam, V.; Al-Hendy, A., Antiproliferative and proapoptotic effects of epigallocatechin gallate on human leiomyoma cells. *Fertility and sterility* 2010, 94 (5), 1887-1893. Zhang et al. demonstrated the utility of EGCG for inhibiting fibroid tumor formation in vivo in nude mouse model. See Zhang, D. et al., *American journal of obstetrics and gynecology* 2010, supra. Al-Hendy et al. also reported that EGCG acting as anti-uterine fibroid agent through the modulation of multiple signal transduction pathways. The group further demonstrated that EGCG works on the gene level to inhibit the proliferation of Human fibroid cells and induces apoptosis. This study also showed a 14-fold increase in the expression of the BMP2 gene in EGCG-treated human fibroid cells than in the untreated control. That major increase in the secretion of BMP2 from fibroids by EGCG treatment is likely to be able to overcome the fibroid-induced endometrial BMP-resistance through increased binding to the BMP receptors which will lead to improvement in the decidualization of the endometrium and subsequently enhancement of implantation, fertility and pregnancy outcomes. Furthermore, studies also demonstrated that EGCG significantly decreased TGF-$\beta$3 production by human fibroid cells. See Ciebiera, M. et al.; Role of transforming growth factor $\beta$ in uterine fibroid biology. *International Journal of Molecular Sciences* 2017, 18 (11), 2435. As TGF-$\beta$3 is the main cytokine responsible for endometrial BMP-resistance, such effect of EGCG would be expected to lead to improved endometrial receptivity.

The foregoing examples of the related art and limitations are intended to be illustrative and not exclusive. Other limitations of the related art will become apparent to those of skill in the art upon a reading of the specification and a study of the drawings or figures as provided herein.

SUMMARY OF THE INVENTION

Figure 1:
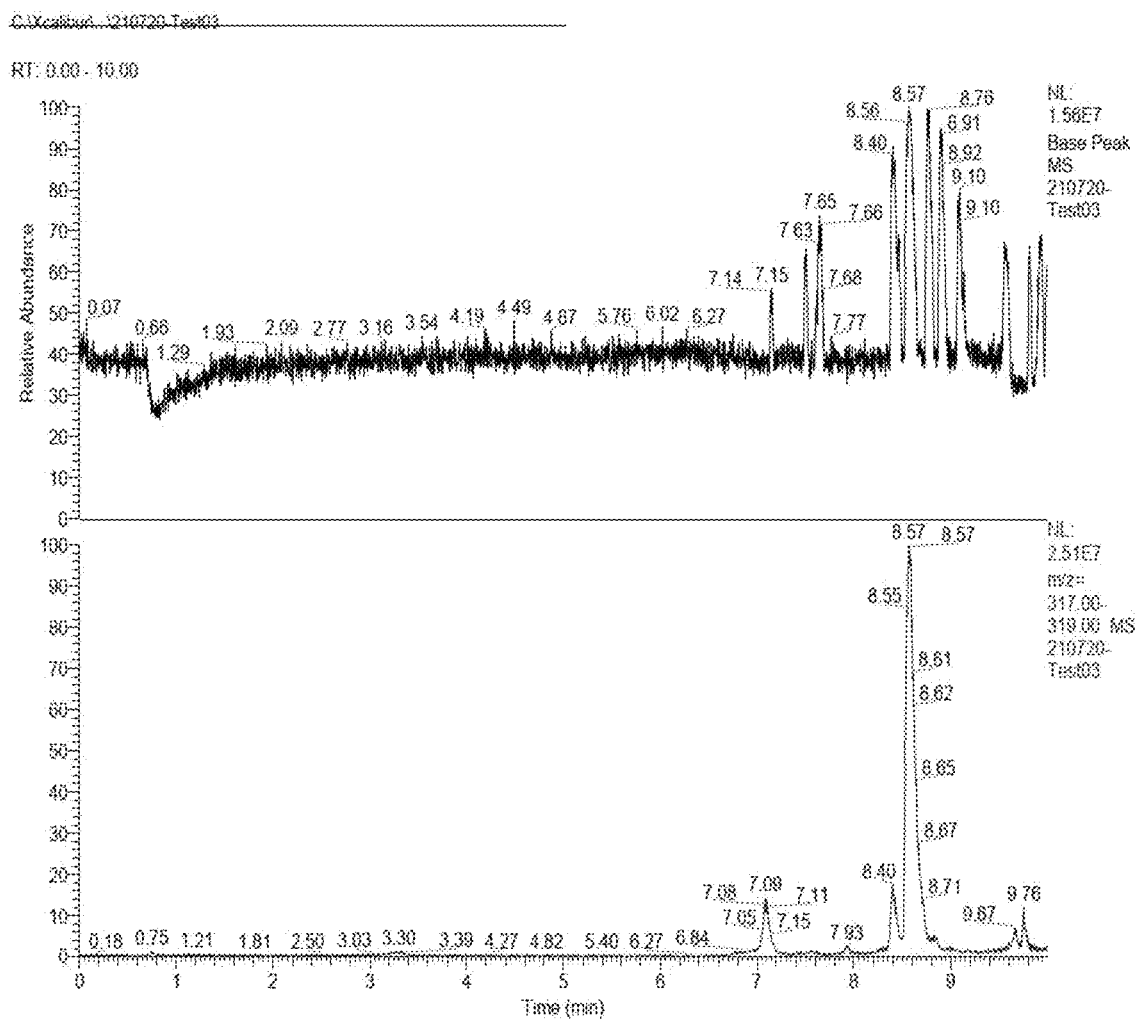
FIG. 1 is a representative chromatograph of Crila®, showing the major components

As disclosed in the present application, the inventors recognized a continuing need for effective, non-hormonal, non-surgical fertility-friendly treatment options for uterine fibroids and related diseases.

The following embodiments, aspects and variations thereof are exemplary and illustrative are not intended to be limiting in scope.

In one embodiment, the present application discloses novel and biologically effective compositions and formulations, and their method of use for the treatment of fibroids.

In one embodiment, the present application discloses a therapeutically active composition comprising an admixture of *Crinum latifolium* L. dry extract (Crila®) and epigallocatechin gallate (EGCG), wherein the ratio of Crila® to EGCG in the composition ranges from 1:10 wt/wt to 100:1 wt/wt. In one variation, the ratio of Crila® to EGCG in the composition ranges from 10:1 wt/wt to 1:100 wt/wt. In another variation, the ratio of Crila® to EGCG in the composition is 1:100, 1:90, 1:80, 1:70, 1:60, 1:50, 1:40, 1:30, 1:20 or 1:10 wt/wt. In another variation, the ratio of EGCG to Crila® in the composition is 1:100, 1:90, 1:80, 1:70, 1:60, 1:50, 1:40, 1:30, 1:20 or 1:10 wt/wt. In one variation, the therapeutically active composition is a pharmaceutical composition. As used herein, a ratio of Crila® to EGCG designated as wt/wt means the weight-to-weight ratio of Crila® to EGCG, which may be expressed in milligrams such as mg/mg, or grams such as g/g (or gm/gm). As used herein, the term "dry extract" refers to the mixture of components or extracts obtained from Crila® and as defined herein, and may be formulated as single components or a specifically isolated mixture of components (or compounds or alkaloids), such as the Crila® composition, as disclosed herein; or the term may include all of the components, including all of the alkaloids and other compounds obtained from an extract of Crila®.

In another embodiment, there is provided a therapeutically active composition comprising isolated Crila® composition 1 to 20, of Table 1. As referred to herein, the therapeutically active composition comprising *Crinum latifolium* L. dry extract may be Crila®, or a Crila® composition comprising the isolated mixtures as recited in Table 1. Accordingly, for example, the Crila® composition 1 (in Table 1) comprises of the components A, B, C, D, E, F, G, H, I, J and K; the Crila® composition 2 (in Table 1) comprises of the components A and B; and the Crila® composition 8 (in Table 1) comprises of the components D, E, F, G and H. In one aspect, the composition comprises an isolated Crila® composition selected from the group consisting of: Crila® composition 1 comprising the components A, B, C, D, E, F, G, H, I, J and K; Crila® composition 2 comprising the components A and B; Crila® composition 3 comprising the components A, B and C; Crila® composition 4 comprising the components A, B, C and D; Crila® composition 5 comprising the components A and C; Crila® composition 6 comprising the components A, C and D; Crila® composition 7 comprising the components A, B, G and H; Crila® composition 8 comprising the components D, E, F, G and H; Crila® composition 9 comprising the components A, D, E, F, G and H; Crila® composition 10 comprising the components A, E, G and H; Crila® composition 11 comprising the components A, B, C, I, J and K; Crila® composition 12 comprising the components C, D, E and E; Crila® composition 13 comprising the components C, D, E, F, G, H and I; Crila® composition 14 comprising the components D, E and E; Crila® composition 15 comprising the components D, E, E, G and H; Crila® composition 16 comprising the components A, D, E and E; Crila® composition 17 comprising the components C, D, G, H and I; Crila® composition 18 comprising the components D, E, F, J and K; Crila® composition 19 comprising the components A, B, C, D, E, F and G; and Crila® composition 20 comprising the components E, F, G and H.

In one aspect of the above composition, the ratio of the Crila® to EGCG in the composition ranges from 1:1 wt/wt to 10:1 wt/wt. In another aspect of the composition, the ratio of the Crila® to EGCG in the composition ranges from 1:1 wt/wt to 5:1 wt/wt. In another aspect, the ratio of the Crila® to EGCG in the composition ranges from 4.0:1 wt/wt to 5.5:1 wt/wt. In another aspect of the above composition, the Crila® and EGCG are formulated as a dry powder. In yet another aspect, the Crila® and EGCG is formulated in a capsule formulation or capsule dosage form.

In one variation of the above composition, the capsule is a soft gel capsule. In another variation, the capsule is a hard capsule. In another variation the capsule is an enterically coated capsule, such as a capsule prepared from a cellulose derivative such as HPMC AS-LF and HP-55 and acrylic/methacrylic acid derivatives, such as EUDRAGIT L100 and S100, with and without plasticizers.

In another embodiment of the present application, there is provided a pharmaceutical composition comprising the above therapeutically active composition comprising an admixture of *Crinum latifolium* L. dry extract (Crila®) and epigallocatechin gallate (EGCG, >95% pure); and a pharmaceutically acceptable excipient, wherein the composition is effective for the treatment of intramural or subserosal fibroids (uterine leiomyomas).

In another embodiment, the application discloses a method of at least one of treating, preventing, slowing the progression of, and reversing one or more symptoms of intramural or subserosal fibroids (uterine leiomyomas) in a subject, or at risk of having one of intramural or subserosal fibroids in a subject in need thereof, the method comprising administering to the subject a therapeutically active composition comprising an admixture of *Crinum latifolium* L. dry extract (Crila®) and epigallocatechin gallate (EGCG), wherein the ratio of the *Crinum latifolium* L. dry extract to EGCG in the composition ranges from 1:10 wt/wt to 100:1 wt/wt, per day, to prevent, slow the progression of, and/or arrest intramural or subserosal fibroids.

In one variation, the application discloses a composition comprising an admixture of *Crinum latifolium* L. dry extract (Crila®) and epigallocatechin gallate (EGCG), wherein the ratio of the *Crinum latifolium* L. dry extract to EGCG in the composition ranges from 1:10 wt/wt to 100:1 wt/wt, for use in the treatment of intramural or subserosal fibroids (uterine leiomyomas) in a subject in need thereof. In another variation, the application discloses a composition comprising an admixture of Crila® and EGCG, wherein the ratio of the *Crinum latifolium* L. dry extract to EGCG in the composition ranges from 1:10 wt/wt to 100:1 wt/wt, for use as a medicament in the treatment of intramural or subserosal fibroids (uterine leiomyomas) in a subject in need thereof.

In one aspect of the above method, the ratio of Crila® to EGCG in the composition ranges from 1:1 wt/wt to 10:1 wt/wt. In another aspect, the ratio of the Crila® to EGCG in the composition ranges from 1:1 wt/wt to 5:1 wt/wt. In another aspect of the method, the ratio of the Crila® to EGCG in the composition ranges from 4.0:1 wt/wt to 5.5:1 wt/wt. In yet another aspect, the Crila® and EGCG are formulated as a dry powder. In another aspect of the above method, the Crila® and EGCG is formulated in a capsule formulation or capsule dosage form.

In another embodiment, there is provided a method for the treatment of cancer in a patient comprising administering to the patient a therapeutically effective amount of a composition comprising isolated Crila® composition selected from the group consisting of: Crila® composition 1 comprising the components A, B, C, D, E, F, G, H, I, J and K; Crila® composition 2 comprising the components A and B; Crila® composition 3 comprising the components A, B and C; Crila® composition 4 comprising the components A, B, C and D; Crila® composition 5 comprising the components A and C; Crila® composition 6 comprising the components A, C and D; Crila® composition 7 comprising the components A, B, G and H; Crila® composition 8 comprising the components D, E, F, G and H; Crila® composition 9 comprising the components A, D, E, E, G and H; Crila® composition 10 comprising the components A, E, G and H; Crila® composition 11 comprising the components A, B, C, I, J and K; Crila® composition 12 comprising the components C, D, E and E; Crila® composition 13 comprising the components C, D, E, F, G, H and I; Crila® composition 14 comprising the components D, E and F; Crila® composition 15 comprising the components D, E, F, G and H; Crila® composition 16 comprising the components A, D, E and F; Crila® composition 17 comprising the components C, D, G, H and I; Crila® composition 18 comprising the components D, E, F, J and K; Crila® composition 19 comprising the components A, B, C, D, E, F and G; and Crila® composition 20 comprising the components E, F, G and H, to a patient in need of such treatment. In another aspect of the method, the cancer is selected from the group consisting of leukemia, neuroblastoma, glioblastoma, cervical, colorectal, pancreatic, renal and melanoma. In another aspect of the method, the cancer is selected from the group consisting of lung, breast, prostate, ovarian and head and neck.

The disclosed compositions comprising Crila® and EGCG separately, or a composition comprising both Crila® and EGCG together in a composition, or the Crila® composition, may include a solubility enhancer or solubilizer selected from oleic acid, Kolliphor® EL (polyoxyl castor oil or Cremophor EL), Vitamin E TPGS (D-α-tocopherol polyethylene glycol-1000 succinate), Maisine® CC (glyceryl monolinoleate), Gelucire® 44/14 (lauroyl polyoxyl-32 glycerides), Miglyol® 812N (esters of saturated coconut and palm kernel oil-derived caprylic fatty acids and glycerin), Plurol® Oleique (polyglyceryl-6 dioleate), Lauroglycol™ 90 (propylene glycol monolaurate (type II), Labrasol® (caprylocaproyl polyoxyl-8 glycerides), Kolliphor® EL (polyoxyl castor oil), Captisol® (SBE-beta-cyclodextrin), Peceol™ (glycerol/glyceryl monooleate (type 40)), sodium deoxycholate, deoxycholic acid and Labrafil® M2125CS (linoleoyl Polyoxyl-6 glycerides).

In one variation, the dose of Crila® or Crila® composition administered is between 50 mg to 5,000 mg per day; and the dose of EGCG administered is between 50 mg to 1,000 mg per day. In another variation, the dose of the composition is between 100 mg per day to 7,000 mg per day. In one variation, the composition is administered daily, or every other day for at least 30 days, 60 days, 90 days, or 120 days. In another variation, the composition is administered for at least 1 month, 2 months, 3 months, 4 months, 5 months or 6 months.

In another embodiment, the application discloses a pharmaceutical composition comprising a therapeutically effective amount of a composition comprising an admixture of *Crinum latifolium* L. dry extract (Crila®) and epigallocatechin gallate (EGCG) of any one of the above embodiments and aspects, or a mixture thereof; and a pharmaceutically acceptable excipient, wherein the composition is effective for the treatment of fibroids; and conditions associated with intramural or subserosal fibroids (uterine leiomyomas), and methods for the treatment of fibroids.

In one variation of the above composition, the composition is a nutraceutical composition, a dietary supplement or a pharmaceutical composition. A nutraceutical composition means a substance or composition that is considered a food or part of a food that provides medical benefits or health benefits, and can be used to help prevent or treat one or more diseases.

In another embodiment, there is provided a method of treating intramural or subserosal fibroids in a subject in need thereof, the method comprising administering to the subject a therapeutically active composition comprising an admixture of *Crinum latifolium* I . . . dry extract (Crila®) and epigallocatechin gallate (EGCG), wherein the ratio of the *Crinum latifolium* L. dry extract to EGCG in the composition ranges from 1:10 wt/wt to 100:1 wt/wt.

In another embodiment, there is provided a method of at least one of treating, preventing, slowing the progression of, and reversing one or more symptoms of intramural or subserosal fibroids (uterine leiomyomas) in a subject, or at risk of having one of intramural or subserosal fibroids in a subject in need thereof, the method comprising administering to the subject a therapeutically active composition comprising *Crinum latifolium* L. dry extract (Crila®) and epigallocatechin gallate (EGCG), wherein the ratio of the *Crinum latifolium* L. dry extract to EGCG in the composition ranges from 1:10 wt/wt to 100:1 wt/wt, to prevent, slow the progression of, and/or arrest intramural or subserosal fibroids.

In one aspect of the above method, the administration of *Crinum latifolium* L. dry extract (Crila®) and epigallocatechin gallate (EGCG), wherein the ratio of the *Crinum latifolium* L. dry extract to EGCG in the composition ranges from 1:10 wt/wt to 100:1 wt/wt, and wherein the administration is a concomitant administration of Crila® and EGCG.

As used herein, the concomitant administration of Crila® and EGCG means that Crila® and EGCG are administered or given to the patient at the same time or almost at the same time, such as where EGCG is given after Crila® or Crila® is given after EGCG, or EGCG is given after Crila® on the same day or Crila® is given after EGCG on the same day.

In another aspect of the above method, the administration of Crila® is 920 mgs, two capsules BID (i.e., twice a day) equivalent to 3680 mgs per day for 90 days, and the administration of EGCG 400 mgs, one capsule BID equivalent to 800 mgs per day for 90 days. In another aspect of the method, the administration of EGCG is 150 mgs, one capsule BID equivalent to 300 mgs per day and of Crila® is 920 mgs, two capsules BID equivalent to 3680 mgs per day for 90 days. In yet another aspect of the method, the administration of EGCG is 150 mgs one capsule combination BID and of Crila® is 920 mgs, two capsules BID equivalent to 3680 mgs per day combination for 90 days.

In yet another aspect of the above method, the dose of Crila® administered is between 50 mg to 5,000 mg per day, and the dose of EGCG administered is between 50 mg to 1,000 mg per day, wherein the composition comprising Crila® and EGCG is administered daily for at least 30 days, 60 days, 90 days, or 120 days.

Also included in the above embodiments, aspects and variations are salts of amino acids such as arginate and the like, gluconate, and galacturonate. Also provided are pharmaceutical compositions comprising pharmaceutically acceptable excipients and a therapeutically effective amount of the compositions.

Pharmaceutical compositions of this invention, may be formulated as powders such as lyophilized powders for oral or parenteral administration. Powders may be reconstituted by addition of a suitable diluent or other pharmaceutically acceptable carrier prior to use. The liquid formulation is generally a buffered, isotonic, aqueous solution. Examples of suitable diluents are normal isotonic saline solution, 5% dextrose in water or buffered sodium or ammonium acetate solution. Such formulations are especially suitable for parenteral administration but may also be used for oral administration. Excipients, such as polyvinylpyrrolidinone, gelatin, hydroxycellulose, acacia, polyethylene glycol, mannitol, sodium chloride, or sodium citrate, may also be added. Alternatively, these compounds may be encapsulated, tableted, or prepared in an emulsion or syrup for oral administration. Pharmaceutically acceptable solid or liquid carriers may be added to enhance or stabilize the composition, or to facilitate preparation of the composition. Liquid carriers include syrup, peanut oil, olive oil, glycerin, saline, alcohols, or water. Solid carriers include starch, lactose, calcium sulfate, dihydrate, terra alba, magnesium stearate or stearic acid, talc, pectin, acacia, agar, silicon dioxide or gelatin. The carrier may also include a sustained release material such as glyceryl monostearate or glyceryl distearate, alone or with a wax. The amount of solid carrier varies but may be between about 20 mg to 1 g per dosage unit. The pharmaceutical preparations are made following the conventional techniques of pharmacy involving milling, mixing, granulation, and compressing, when necessary, for tablet forms; or milling, mixing, and filling for hard gelatin capsule forms. When a liquid carrier is used, the preparation will be in the form of a syrup, elixir, emulsion, or an aqueous or non-aqueous suspension. Such a liquid formulation may be administered directly p.o. or filled into a soft gelatin capsule.

In one aspect, the disclosed composition if formulated in a capsule, such as a gel capsule. In a particular application, the capsule is a hard capsule, where the shell of the capsule may comprise gelatin, hydrolyzed starch or a cellulose derivative such as hydroxypropylmethylcellulose (hypromellose). In one variation, the capsule comprises a plurality of particles and one or more pharmaceutically acceptable excipients. The excipients may be selected from gelling polymers, fillers, effervescent systems, glidants, ion exchange resin powders or combinations thereof; or as disclosed herein. In one variation, the capsule may comprise one or more excipients. In one variation, the capsule may comprise one or more gelling polymers, where the gelling polymer is a hydrophilic gelling polymer, which absorbs water or solvent and/or swells to form a viscous mixture or gel. Examples of suitable hydrophilic gelling polymers include cellulose ethers (e.g., hydroxypropylcellulose, hydroxypropylmethylcellulose, sodium carboxymethyl cellulose, methylcellulose, hydroxyethylcellulose etc.,), polyalkylene oxides (e.g., polyethylene oxide, polypropylene oxide etc.,), natural gums (e.g., glucomannan, guar gum, gum arabic, gum tragacanth, tara gum, alginate, alginic acid, fucoidan, laminarin, agar, carrageenans, xanthan gum, gellan gum, dextran, welan gum, diutan gum, pullulan etc.,), polyacrylic acids or crosslinked polyacrylic acids (e.g., carbomers), polyvinyl alcohol, polyvinylpyrrolidone, polyamines, or combinations of the gelling polymers. The average molecular weight of the gelling polymer may range from about 30,000 to about 15,000,000. Where a gelling polymer is employed in the capsule, the amount of gelling polymer may range from about 0.1% to about 50% by weight of the contents of the capsule; or from about 0.1% to 10%, from about 10% to 20%, from about 20% to 30%, from about 30% to 40%, or from about 40% to 50% by weight of the contents of the capsule.

In another variation, the capsule further comprises one or more fillers or diluents. Suitable fillers may include cellulose, microcrystalline cellulose, cellulose derivatives (e.g., calcium carboxymethyl cellulose, ethyl cellulose), starch (such as potato starch), modified starches, pregelatinized starch, glucose/dextrose, fructose, sucrose, lactose, mannitol, sorbitol, xylitol, calcium carbonate, calcium sulfate, calcium phosphate, calcium silicate, magnesium carbonate, magnesium oxide, or combinations thereof. The amount of filler may range from about 0.1% to about to 50% by weight of the contents of the capsule; or about 0.1% to 10%, from about 10% to 20%, from about 20% to 30%, from about 30% to 40%, or from about 40% to 50% by weight of the contents of the capsule.

Suitable formulations for each of these methods of administration may be found in, for example, Remington: *The Science and Practice of Pharmacy*, A. Gennaro, ed., 20th edition, Lippincott, Williams & Wilkins, Philadelphia, Pa.

In addition to the exemplary embodiments, aspects and variations described above, further embodiments, aspects and variations will become apparent by reference to the drawings and figures and by examination of the following descriptions.

DETAILED DESCRIPTION OF THE INVENTION

Definitions

Unless specifically noted otherwise herein, the definitions of the terms used are standard definitions used in the art of organic synthesis and pharmaceutical sciences. Exemplary embodiments, aspects and variations are illustratived in the figures and drawings, and it is intended that the embodiments, aspects and variations, and the figures and drawings disclosed herein are to be considered illustrative and not limiting.

"Pharmaceutically acceptable salts" means salt compositions that is generally considered to have the desired pharmacological activity, is considered to be safe, non-toxic and is acceptable for veterinary and human pharmaceutical applications. Such salts include acid addition salts formed with inorganic acids such as hydrochloric acid, hydrobromic acid, sulfuric acid, phosphoric acid, and the like; or with organic acids such as acetic acid, propionic acid, hexanoic acid, malonic acid, succinic acid, malic acid, citric acid, gluconic acid, salicylic acid and the like.

"Therapeutically effective amount" means an amount of a compound or drug that elicits any of the biological effects listed in the specification.

Experimental:

The following procedure may be employed for the preparation of the compositions of the present application. The compositions include the mixture of active components of the Crila® powder as well as selected and isolated components and mixtures of components in the Crila® powder.

Crila® Powder:

Crila® comprises of a dry plant extract that is a cultivar *Crinum latifolium* L var. crilae Tram & Khanh from the family of Amaryllidaceae. The dry plant extract may be obtained from the cultivar in a number of ways.

For example, the leaves from the live plants are picked at the desired time of the cultivar's age and size to optimize the amount and ratio of the active ingredients. The leaves of the plants are typically harvested after about 2-3 years, depending on the growing conditions and weather. In one method, the leaves are collected and washed with water to remove dirt and extraneous materials. In one variation, the leaves are aired-out and dried in full sun for at least 24 to 48 hours to reduce the water content. Alternatively, the leaves are placed in a withering tray, and warm air (about 45° C.) is passed over the leaves for an amount of time to provide the dried leaves at the desired water content, which is typically a water content of less than about 5% water; or a moisture content of less than 5% is obtained. The water content may be determined using the Karl-Fischer (KF) method or other standard methods known in the art. The dry leaves may be stored for up to one or two years in a dry and dark storage space.

Fermentation and Extraction Process:

About an equal weight of water is then added to the dry leaves, and the slurry is allowed to stand for about 3 hours. The resulting slurry is then gently pressed or rolled with a roller repeatedly for at least 3 hours to break down the cells of the leaves, allowing the chemical elements to mix together. Rolling of the leaves may be performed at room temperature or at about 40° C. or less, for a desired amount of time, such as for 6 to 12 hours or up to about 48 hours.

The resulting aqueous slurry of leaves is then warmed to about 45 to 50° C. and stirred for at least 6 to 12 hours to allow a mixing of the actives and "fermentation process" to take place in the solution. The slurry is then further processed by an extraction process using a solvent or solvent mixture, such as the addition of water, or water and alcohol mixture, such as ethanol. The water to ethanol mixture may be a 10% ethanol in water, 20% ethanol in water, 30% ethanol in water or about 40% ethanol in water. The resulting water-alcohol slurry is then stirred for at least 3 hours, from about 3 hours to 12 hours, or up to about 24-30 hours to extract the actives from the slurry containing the leaves and leave fragments. The amount of time employed in the extraction process is based, in part, on the water-alcohol ratio as well as the amount of aqueous slurry is being processed.

Alternatively, the *Crinum latifolium* L. plant (or leaves) extract may be obtained by an extraction process using an organic solvent selected from the group consisting of ethanol, methanol, diethyl ether, ethyl acetate, methyl acetate, acetone, MTBE, MEK, ethylene glycol, hexanes, heptane, chloroform, dichloromethane or mixtures thereof. In another variation, the *Crinum latifolium* L. extract may be obtained by an extraction process using a combination of hot water (about 45° C. to 90° C.) and ethanol. In another variation, the *Crinum latifolium* L. extract may be obtained by an extraction process using a mixture of water and the above cited organic solvent or solvent mixtures. In one variation, the extraction solvent is selected from warm water at about 50° C. to 60° C., a mixture of solvents such as ethyl acetate and water, ethyl acetate and methanol, and ethyl acetate and hexanes.

When a mixture of solvents is used in the extract process, the more polar solvent in the solvent mixture may be increased over time during the extraction process. For example, when a mixture of solvents, such as ethyl acetate and methanol are used in the extraction process, the initial solvent mixture may be about 5% methanol in ethyl acetate, and the amount of methanol may be increased step-wise over time, such as in a second or subsequent extraction step. The increase in the amount of methanol may be, for example, from a 5% methanol in ethyl acetate, to 10% methanol, to 20% methanol, to 30% methanol, to 40% methanol, to 50% methanol, to 60% methanol, to 70% methanol, to 80% methanol and then to 90% methanol in ethyl acetate. Alternatively, the extraction may be conducted using super critical extraction methods using liquid $CO_2$ as known in the art.

The slurry is then filtered or strained to remove large pulp fibers by filtering or straining through a stainless steel 28 or 38 mesh screen, 28 or 38 mesh basket strainer or filtering through an in-line 28 or 38 mesh strainer. The filtrate is stirred for about 3 hours and transferred to a low-pressure distillation still where the distillate of water and ethanol is distilled at about 45° C. under reduced pressure. The resulting brownish-green slurry is transferred to a holding tank and optionally, potato starch and silicon dioxide bulk is added to the slurry and stirred for about 3 hours.

Isolation by Spray Drying Process:

The resulting slurry is spray dried using standard parameter known in the art, such as using a spray drier equipped with pressure nozzle. The concentration of the plant slurry may be between 10-15% or up to 25% dry matter contents. Inlet air temperature, feed temperature, and pump rate of spray drying were chosen in the range of 100 to 150° C., 5 to 30° C. and 20 to 40% (50 L/hr to 100 L/hr), respectively. The sprayed dried material is removed from the spray dryer and then stored in a dry holding tank, and then analyzed for quality control. Once the product passes the desired quality standards, the Crila® powder is then encapsulated and bottled.

FIG. 1 (FIG. 1) is a representative spectrograph of a sample of the dry Crila® powder formulated for analysis using LC/MS/MS/MS employing a Thermo TSQ Vantage Triple Stage Quadrupole LC/MS/MS/MS system with a Thermo Finnigan TSQ Vantage and HESI II Source with 2 mechanical pumps and Xcalibur Data System to provide optimal assay precision and accuracy. The TSQ Vantage is equipped with an ion source, second generation (G2) ion optics and hyperbolic quadrupoles to provide high sensitivity with low chemical noise. The spectrum is displayed as a full time trace off of the LC/MS/MS/MS. The chromatographs shows the results of the scanned data. The second graph is the EIC method developed with an internal standard. A 0.5×50 mm, Targa C-18 AQ column was employed for the separations with a flow rate of 40 µls/min.

Figure 2:
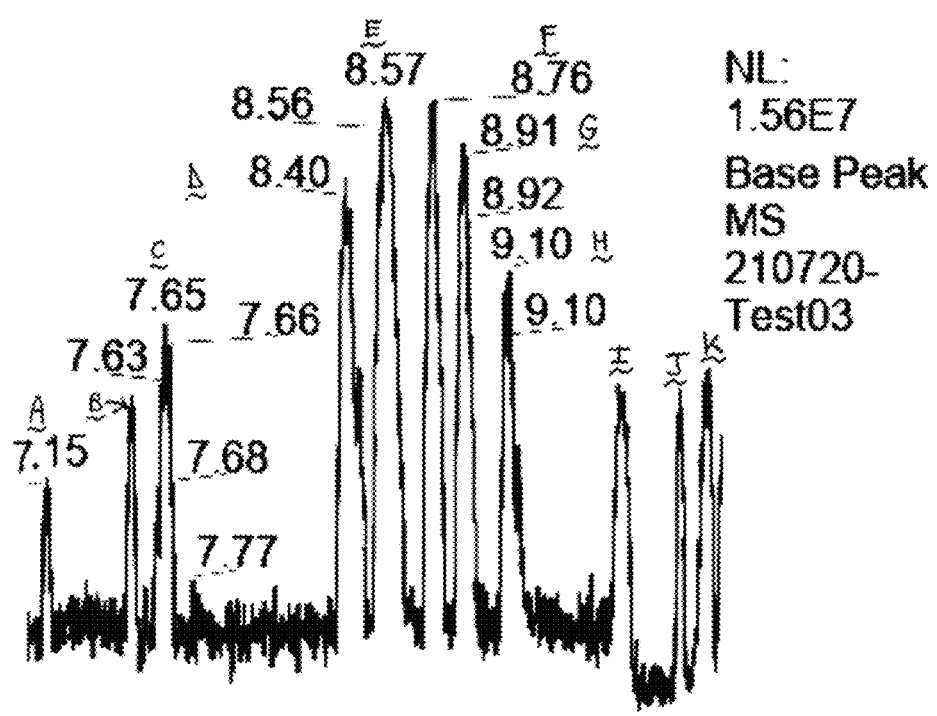
FIG. 2 is an expanded and labeled representative chromatograph of a section of FIG. 1 where the main peaks, along with their retention times, are labeled sequentially as peaks A, B, C, D, E, F, G, H, I, J and K.

FIG. 2 (FIG. 2) is an expanded region of the spectrograph of FIG. 1, showing the separation and designation of the various major components of Crila® with the labeled peaks (A to K) with the relative retention times (RT, in minutes), respectively, as A (7.15), B (7.63), C (7.65), D (8.40), E (8.57), E (8.76), G (8.91), H (9.10), I (9.63), J (9.85), and K (9.97) in a particular region of the spectrograph. As observed from the chromatograph, for example, in the peak designed as peak C (7.65), there are at least a second unresolved component (or peak) at an RT of 7.66.

The major alkaloid components identified from Crila® include lycorine, crinamidine, flexinine, ambellin, epoxyambellin, triphaeridine, 11,12-dehydroanhydro bowdensine, macronine, 1-epidemethybowdensine, lycobetaine, crinine, crinamine or 8-O-demethyl-homolycorine, norgalanthamine, homolycorine, cripowellin B, lycorine dimer, flexinine and 1-O-acetyllycorine. See Nguyen Thi Ngoc Tram et al, Fitoterapia, 2002 June; 73 (3); 183-208 and Silva, L. C. et al, Molecules, 2002 May 6; 27 (9); 2976. An LC/MS chromatogram of the Crila® composition may be employed to separate the various alkaloid components and identify the alkaloid or mixture of alkaloids associated with the different fractions that may be isolated and collected for biological evaluation.

Figure 3:
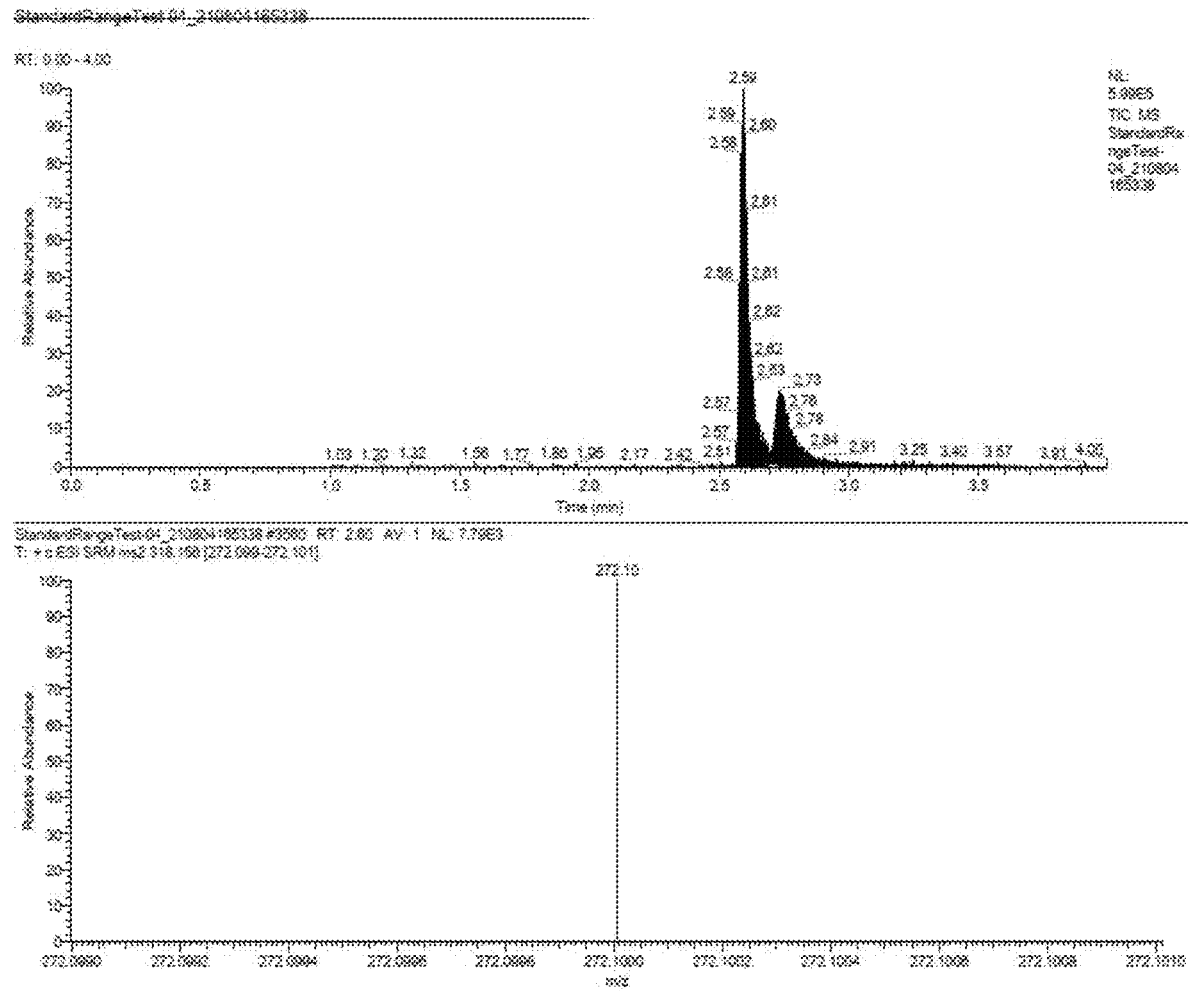
FIG. 3 is a representative graph showing the quantitation of the extracted peak in the mixture that is crinamidine, showing the complete MS data information and confirmation ions from the crinamidine molecule.

FIG. 3 (FIG. 3) is a representative graph showing the quantitation of the extracted peak in the mixture that is crinamidine, showing the complete MS data information and confirmation ions from the crinamidine molecule. The system shows a transmission of a MW 318.156, which is the single charge ion MW+H of crinamidine which has an exact mass of 317.1257742 Da. Since the system is a triple quadrupole system and not an accurate mass system, a small variance is observed from the true calculated mass. The daughter ion created after passing through the collision cell appears to represent a loss of $C_2H_3O$, or a fragmentation of a ring resulting in a monitored ion MW of 272.099-272.101 Da. Typically, daughter ions are analyzed and identified by a direct infusion of the parent molecule in solution and then optimizing energy and collision cell parameters to produce fragments of the parent molecule. After identifying potential monitoring ions, a method may be created to analyze the complex sample to identify the transition ions with the least amount of interference and the best overall signal, which are then utilized as quantitative/qualitative ion selections for a method validation series.

The liquid chromatograph (LC) gradient program of different solvent system with formic acid employed water ($H_2O$), methanol (MeOH) with 0.1% formic acid, as represented in the table below.

| Gradient | Solvent mixture with 1% formic acid | |
|---|---|---|
| Time (in minutes) | Water ($H_2O$) | Methanol (MeOH) |
| 0 | 90 | 10 |
| 1.50 | 50 | 50 |
| 1.55 | 0 | 100 |
| 2.75 | 0 | 100 |
| 2.80 | 90 | 10 |
| 4.00 | 90 | 10 |

Crila® Alkaloid Components for Treatment of Uterine Fibroids:

Based on the results obtained from the spectrograph the sample of Crila® analyzed via LC/MS/MS/MS using a Thermo TSQ Vantage Triple Stage Quadrrupole LC/MS/MS/MS system, an optimal method may be designed for a scale-up, preparatory scale for the isolation of the above identified components of Crila®, via preparatory scale HPLC. The resulting isolated fractions of the components identified as A (7.15), B (7.63), C (7.65), D (8.40), E (8.57), E (8.76), G (8.91), H (9.10), I (9.63), J (9.85), and K (9.97), and their various mixtures ("Crila® composition No. 1 to 20), as summarized in the Table 1 below, were obtained, and the volatile solvents were removed by freeze drying or lyophilization to obtain the alkaloid residue or mixture of alkaloids residue (also referred to as the "Crila® dry extract") for biological evaluation.

TABLE 1

| Crila ® composition | Isolated Crila ® Composition | Activity Uterine Fibroids (inhibits the proliferation of HuLM cells) | MTS Proliferation (50% inhibition ($IC_{50}$) |
|---|---|---|---|
| 1 | A, B, C, D, E, F, G, H, I, J and K | Active | Active |
| 2 | A and B | Active | Active |
| 3 | A, B and C | Active | Active |
| 4 | A, B, C and D | Active | Active |
| 5 | A and C | Active | Active |
| 6 | A, C and D | Active | Active |
| 7 | A, B, G and H | Active | Active |
| 8 | D, E, F, G and H | Active | Active |
| 9 | A, D, E, F, G and H | Active | Active |
| 10 | A, F, G and H | Active | Active |
| 11 | A, B, C, I, J and K | Active | Active |

TABLE 1-continued

| Crila® composition | Isolated Crila® Composition | Activity Uterine Fibroids (inhibits the proliferation of HuLM cells) | MTS Proliferation (50% inhibition (IC$_{50}$) |
|---|---|---|---|
| 12 | C, D, E and F | Active | Active |
| 13 | C, D, E, F, G, H and I | Active | Active |
| 14 | D, E and F | Active | Active |
| 15 | D, E, F, G and H | Active | Active |
| 16 | A, D, E and F | Active | Active |
| 17 | C, D, G, H and I | Active | Active |
| 18 | D, E, F, J and K | Active | Active |
| 19 | A, B, C, D, E, F and G | Active | Active |
| 20 | E, F, G and H | Active | Active |

As noted above, the designation of a particular composition, i.e., the "Crila® Composition" (also as noted in the above table), such as a composition identified as component C (7.65), for example, may include one or more alkaloids or other natural product compounds in Crila®. The above Crila® compositions constitute a subset of the botanical composition, a drug, or a complex mixture that may lack a distinct active ingredient, obtained from the natural product that is Crila®, and that comprises multiple plant ingredients.

Cytotoxicity of Isolated Crila® Composition:
MTS Proliferation Assay Using SK-N-AS Cells Day 1: SK-N-AS cells are plated in appropriate growth medium at $5 \times 10^3$ per well in 100 µL in 96 well tissue culture plates, Falcon, one plate for each sample of Crila® or a Crila® composition to be tested. Column 1 was blank; it contained medium, but no cells. The plates are incubated overnight at 37° C. in 5% CO$_2$ to allow attachment.

Day 2: Crila® or a Crila® composition diluted in culture media is added to the cells at a concentration of 0.005 nM to 10 µM, in quadruplicate. After 48-72 hours of the Crila® or a Crila® composition exposure, the MTS agent is added to all wells and incubated 1-6 hrs (37° C., 5% CO$_2$), depending on cell type, as per CellTiter 96® Aqueous Non-Radioactive Cell Proliferation Assay (MTS), Promega. Plates are processed using a Bio-Tek Synergy HT Multi-detection microtiter plate reader at 490 nanometer wavelength and data are processed with KC4V.3 software. Data plots of Crila® or a Crila® composition concentration vs. absorbance are plotted and the concentration resulting in 50% inhibition (IC$_{50}$) is extrapolated for each of the tested (isolated) Crila® or a Crila® composition. Crila® or a Crila® composition and EGCG for Treatment of Uterine Fibroids:

Effect of Crila® or a Crila® composition (Table 1) and/or EGCG on the Uterine Fibroid Growth: In one study, we used Human Leiomyoma (HuLM) Cells in our initial evaluation of Crila® and/or EGCG treatment. Crila®, used alone or in combination with EGCG, were evaluated for their ability to inhibit the proliferation of HuLM cells in an experimental approach as described below. Similarly, the Crila® compositions are evaluated for their ability to inhibit the proliferation of HuLM cells in an experimental approach as described below.

Effect of Single or Combined Agent Treatments on HuLM Cell Growth:

Crila® and/or EGCG were analyzed at the various concentrations and time points specified.

| Crila® alone | |
|---|---|
| 1, 3, 5, 7 days | |
| Crila® | 0 µg/ml |
| Crila® | 100 µg/ml |
| Crila® | 250 µg/ml |
| Crila® | 500 µg/ml |
| Crila® | 1000 µg/ml |
| Crila® | 2000 µg/ml |
| Crila® | 3000 µg/ml |
| Crila® | 4000 µg/ml |

| IC50 µg/ml | MEAN | SEM |
|---|---|---|
| Day 1 | 2437.7 | 140.9 |
| Day 3 | 1682.8 | 280.3 |
| Day 5 | 971.5 | 223.9 |
| Day 7 | 902.5 | 76.2 |

Figure 4:
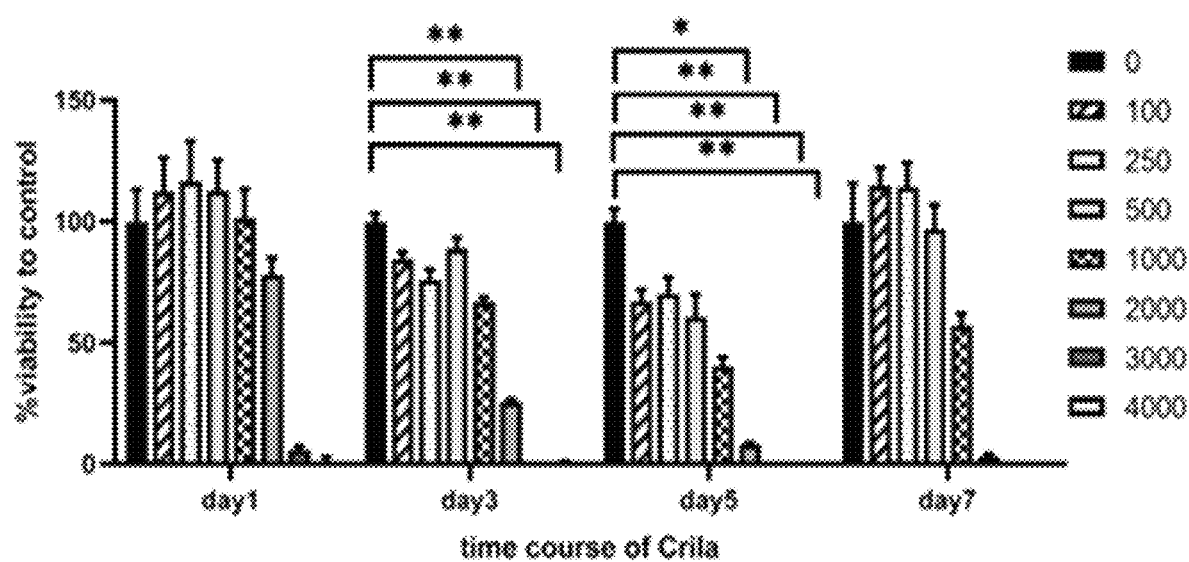
FIG. 4 is a representative graph showing Crila® used alone effectively reduced viability of HuLM cells starting from 1000 µg/ml concentration and higher, but only after 5 days and 7 days treatment.

As FIG. 4 shows, Crila® used alone effectively reduced viability of HuLM cells starting from 1000 µg/ml concentration and higher, but only after 5 days and 7 days treatment with IC50's of 971.5±223.9 µg/ml and 902.5±76.2 µg/ml, respectively. This inhibitory effect seen on day 5 was statistically significant (*p value<0.05, ** p<0.01).

| EGCG alone | |
|---|---|
| 1, 3, 5, 7 days | |
| EGCG | 0 µM |
| EGCG | 10 µM |
| EGCG | 25 µM |
| EGCG | 50 µM |
| EGCG | 100 µM |
| EGCG | 200 µM |

Figure 5:
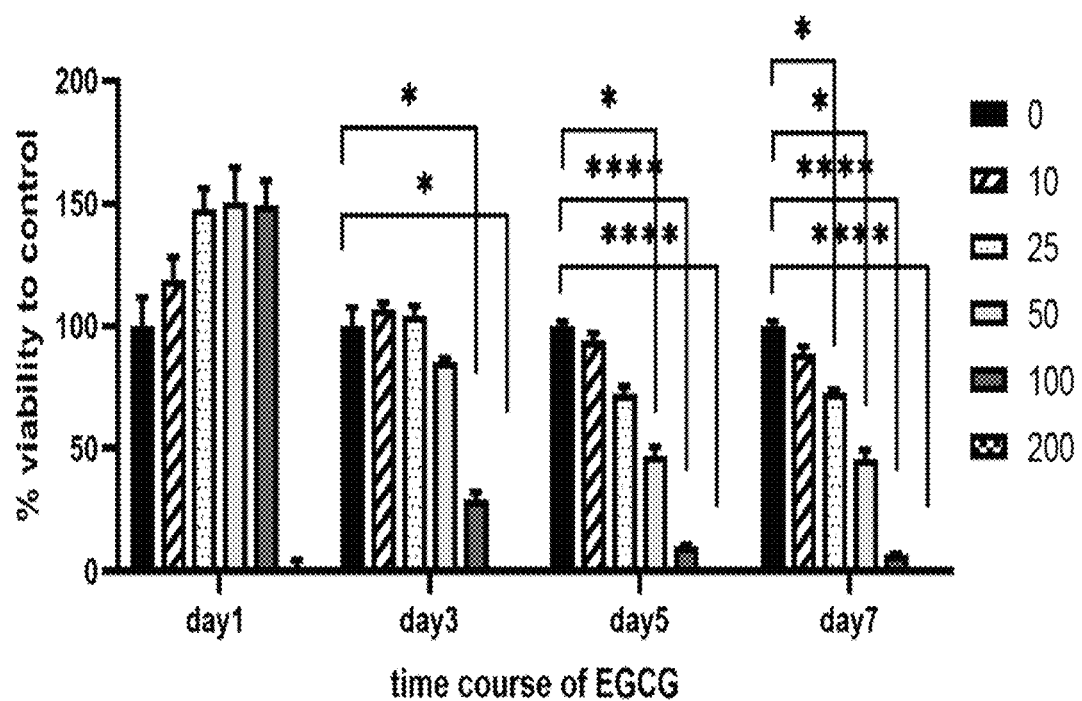
FIG. 5 is a representative graph showing EGCG used alone effectively reduced the HuLM cells viability starting from 50 µM concentration and higher after 5 days treatment, and starting from 25 µM concentration after 7 days treatment.

As shown in FIG. 5 EGCG used alone effectively reduced the HuLM cells viability starting from 50 µM concentration and higher after 5 days treatment, and starting from 25 µM concentration after 7 days treatment. This inhibitory effect seen on day 5 and day 7 for these doses was statistically significant (*p value<0.05, **** p<0.0001)

Because 1 day treatment of both agents resulted in some inconsistent data, we decided to focus on the 2, 3, 5 and 7 days of treatment for the following studies of treating the cells with combined drugs. Crila® in combination with EGCG treatment design and results are shown below.

| Combination of Crila® and EGCG | |
|---|---|
| 2, 3, 5 and 7 days | |
| EGCG + Crila | 50 µM + 0 µg/ml |
| EGCG + Crila | 50 µM + 100 µg/ml |
| EGCG + Crila | 50 µM + 250 µg/ml |
| EGCG + Crila | 50 µM + 500 µg/ml |
| EGCG + Crila | 50 µM + 1000 µg/ml |

Figure 6:
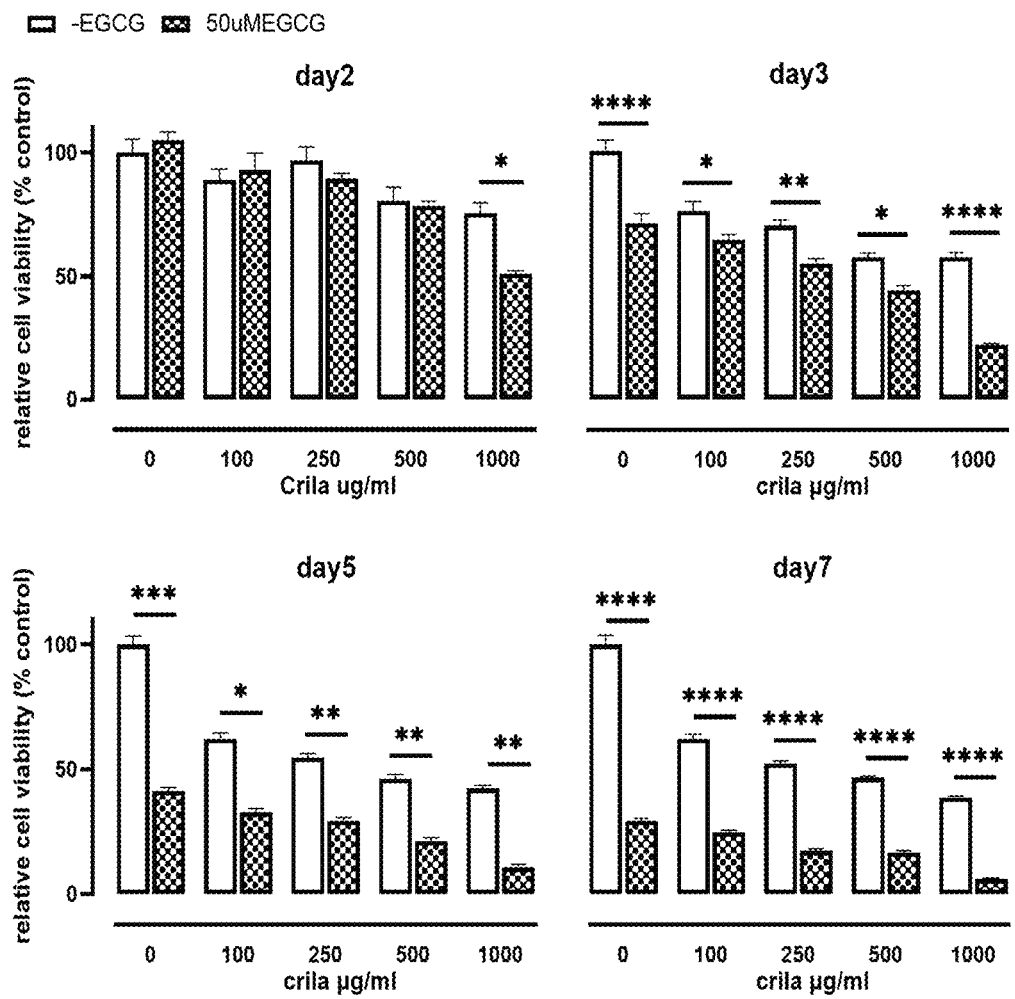
FIG. 6 is a representative graph showing that, when combined with 50 µM EGCG (shaded box), all Crila® concentrations tested showed effectively reduced the HuLM cells viability after 3 days, 5 days and 7 days treatment.

As shown in FIG. 6, when combined with 50 µM EGCG (shaded box), all Crila® concentrations tested showed effectively reduced the HuLM cells viability after 3 days, 5 days and 7 days treatment compared to Crila® treatment alone (white box). This inhibitory effect seen starting at 3 days and continuing to 7 days for these doses in combination with EGCG was statistically significant (*p<0.05,  p<0.01 * p<0.001, **** p<0.0001, respectively). These experiments were repeated 2 separate times.

The results demonstrated that Crila® at tested concentrations of 100-1000 µg/ml for 3-7 days treatment displayed more inhibitory effects on HuLM viability when combined with EGCG. These effects were seen at the lowest concentration of 100 µg/ml Crila® starting at 3 days treatment.

Similarly, the Crila® compositions are evaluated for their ability to inhibit the proliferation of HuLM cells in an experimental approach as described above and evaluated at concentrations of 100-1000 µg/ml for 3-7 days treatment display more inhibitory effects on HuLM viability when combined with EGCG.

Synergistic Inhibitory Effect of Crila® or Crila® Composition and EGCG on HuLM Cell Growth:

To further investigate whether treatment of Crila® combined with EGCG have synergistic effects on HuLM cell viability, we focused on the 3 days, 5 days and 7 days treatment of the following study at 10, 25 and 50 µM of EGCG, based on the above studies.

| Crila ® in combination with EGCG treatment design and results are shown below. | |
|---|---|
| | 3, 5, 7 days |
| Crila + EGCG | 0 µg/ml + 0 µM |
| Crila + EGCG | 100 µg/ml + 10 µM |
| Crila + EGCG | 250 µg/ml + 10 µM |
| Crila + EGCG | 500 µg/ml + 10 µM |
| Crila + EGCG | 1000 µg/ml + 10 µM |
| Crila + EGCG | 100 µg/ml + 25 µM |
| Crila + EGCG | 250 µg/ml + 25 µM |
| Crila + EGCG | 500 µg/ml + 25 µM |
| Crila + EGCG | 1000 µg/ml + 25 µM |
| Crila + EGCG | 100 µg/ml + 50 µM |
| Crila + EGCG | 250 µg/ml + 50 µM |
| Crila + EGCG | 500 µg/ml + 50 µM |
| Crila + EGCG | 1000 µg/ml + 50 µM |

Figure 7:
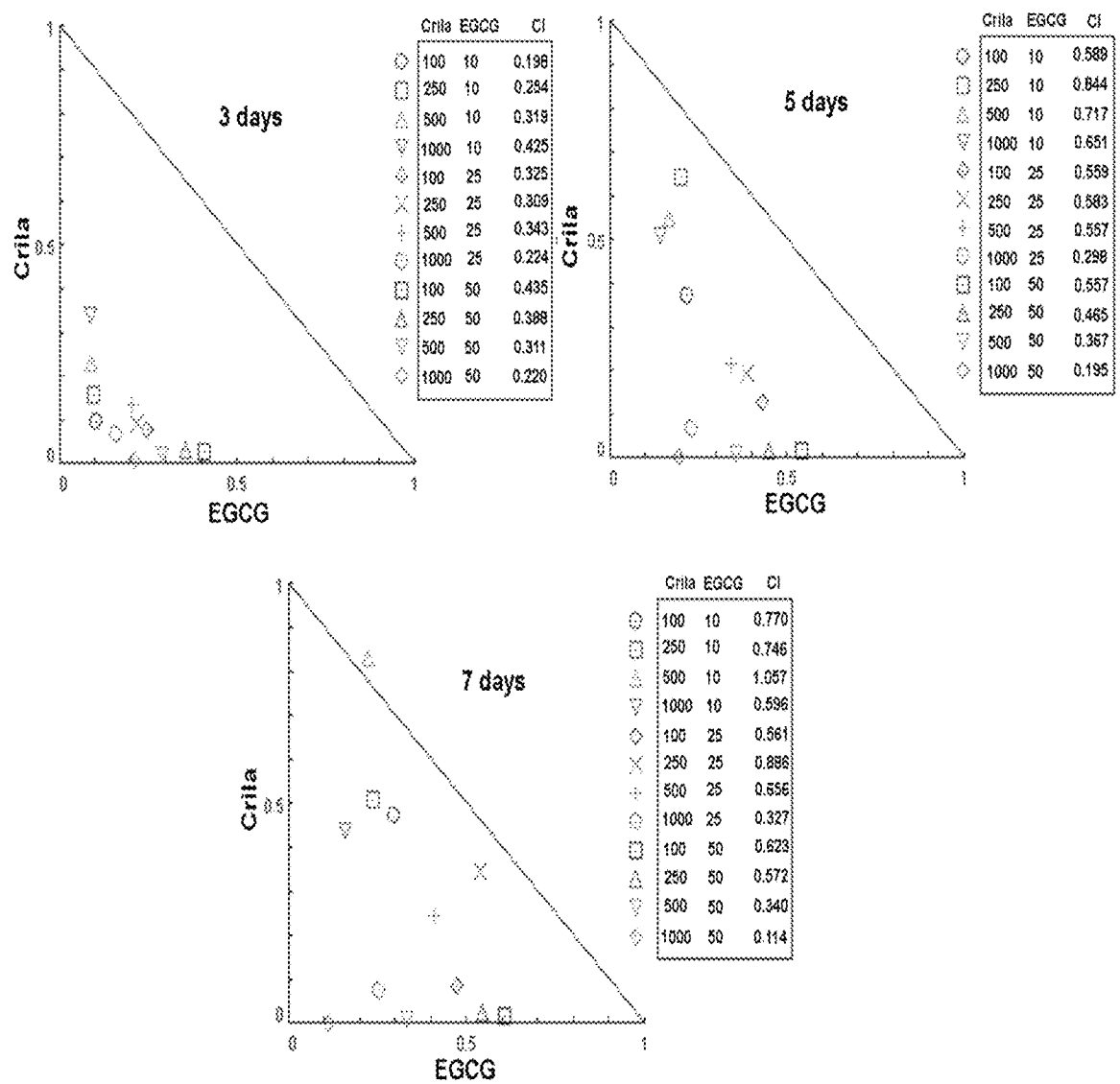
FIG. 7 is a representative graph showing that when combined with 25 and 50 UM EGCG, all Crila® concentrations tested showed synergistically inhibitory effects on the HuLM cells viability after 3 days, 5 days and 7 days treatment.

As shown in FIG. 7, when combined with 25 and 50 µM EGCG, all Crila® concentrations tested showed synergistically inhibitory effects on the HuLM cells viability after 3 days, 5 days and 7 days treatment. However, when combined with 10 µM EGCG, the Crila® concentrations tested did not result in consistent synergistically inhibitory effects on the HuLM cell growth, especially in point 3 (500 µg/ml Crila® combined with 10 µM EGCG) where the opposite effect occurred. These experiments were repeated 2 separate times.

We conclude that combination of Crila® and EGCG at tested concentrations of 100-1000 µg/ml for Crila and 25-50 µM for EGCG for 3-7 days treatment displayed synergistically inhibitory effects on HuLM viability. These effects were not consistently seen when Crila® were combined with 10 µM EGCG.

Similarly, the Crila® composition combined with EGCG have synergistic effects on HuLM cell viability, at 3 days, 5 days and 7 days treatment using 10, 25 and 50 µM of EGCG.

Crila and EGCG Treatments Depressed HuLM Cell Growth by Decreased Proliferation, not Increased Apoptosis:

Based on established combined agent concentrations, we evaluated whether the inhibition of HuLM cell growth is caused by suppression of proliferation markers such as PCNA or pro-apoptosis marker BAX or both at both mRNA and protein levels using qRT-PCR and western blotting analyses, respectively.

Figure 8:
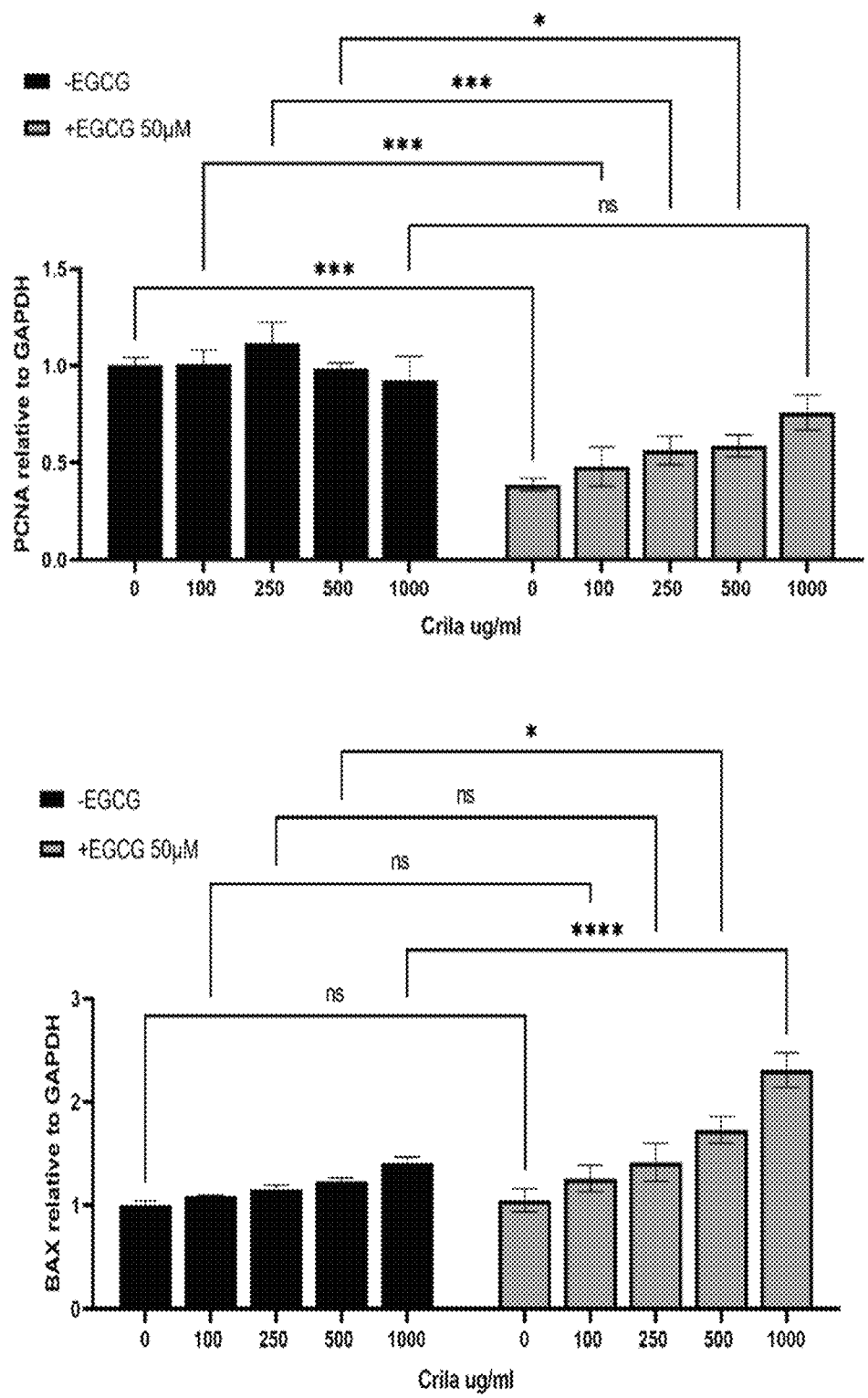
FIG. 8 is a representative graph showing that when combined with 50 µM EGCG, Crila® at concentrations from 100 to 500 µg/ml used resulted in significant decrease in level of proliferation marker PCNA mRNA compared to single agent treatments.

The results from real-time RT-PCR in FIG. 8 showed when combined with 50 HM EGCG, Crila® at concentrations from 100 to 500 µg/ml used resulted in significant decrease in level of proliferation marker PCNA mRNA compared to single agent treatments, but this effect reached a plateau at this point since 1000 µg/ml of Crila® combined with 50 µM EGCG did not result in more significant PCNA expression decrease compared to 1000 µg/ml of Crila® alone.

Real-time RT-PCR analysis of BAX showed when combined with 50 µM EGCG, only 1000 µg/ml of Crila® led to significant upregulation in level of apoptotic marker BAX mRNA compared to single agent treatments, but this effect was not seen in those of lower than 1000 µg/ml of Crila® in combination with 50 µM EGCG.

Similarly, the Real-time RT-PCR analysis of BAX suggests that, when combined with 50 µM EGCG, only 1000 µg/ml of the Crila® composition leads to significant upregulation in level of apoptotic marker BAX mRNA compared to single agent treatments.

Figure 9:
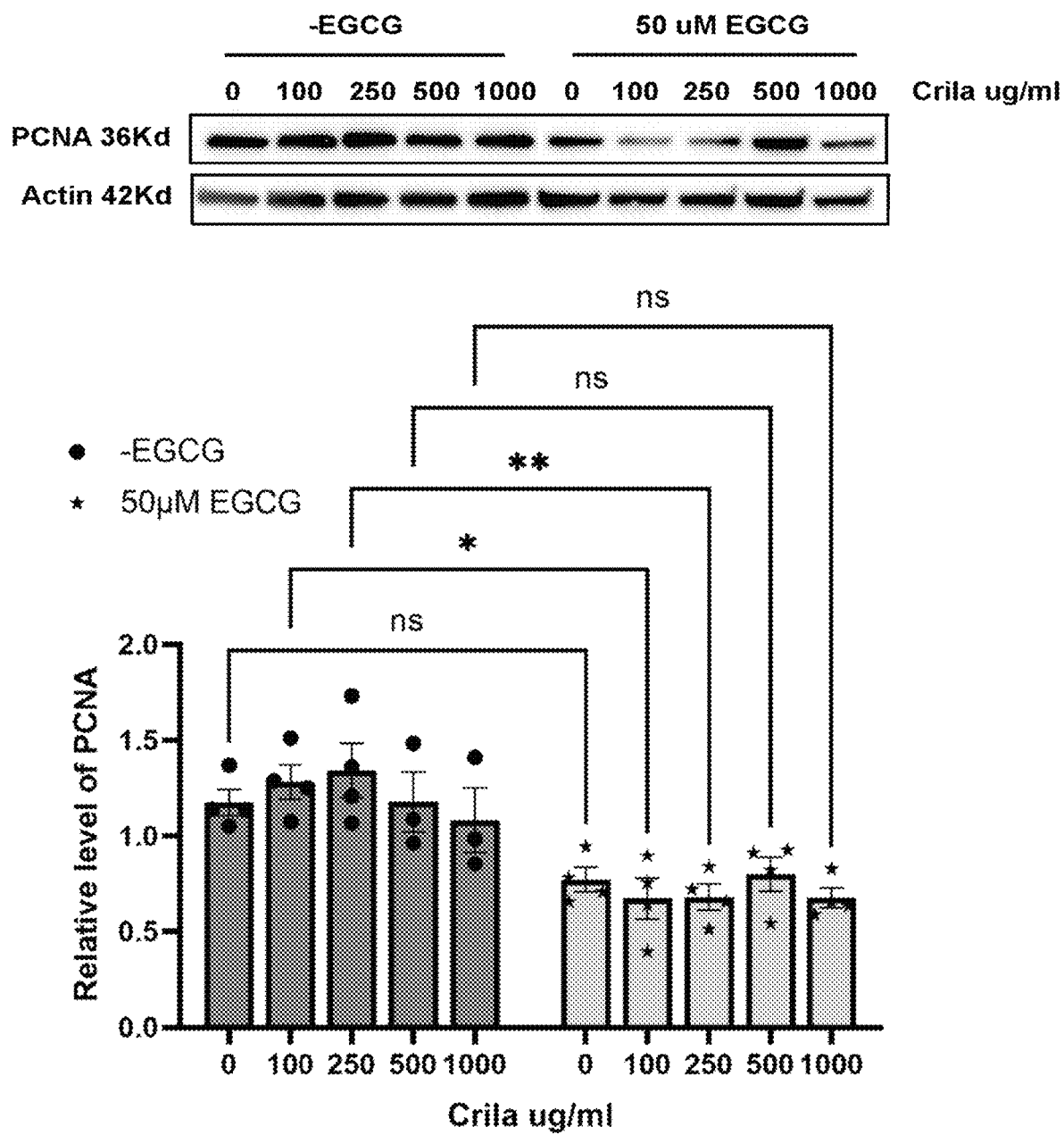
FIG. 9 is a representative result from western blotting analysis showed when combined with 50 µM EGCG, Crila® at concentrations from 100 to 250 µg/ml used in this study resulted in significant decrease in level of proliferation marker PCNA protein compared to single agent treatments.
Figure 10:
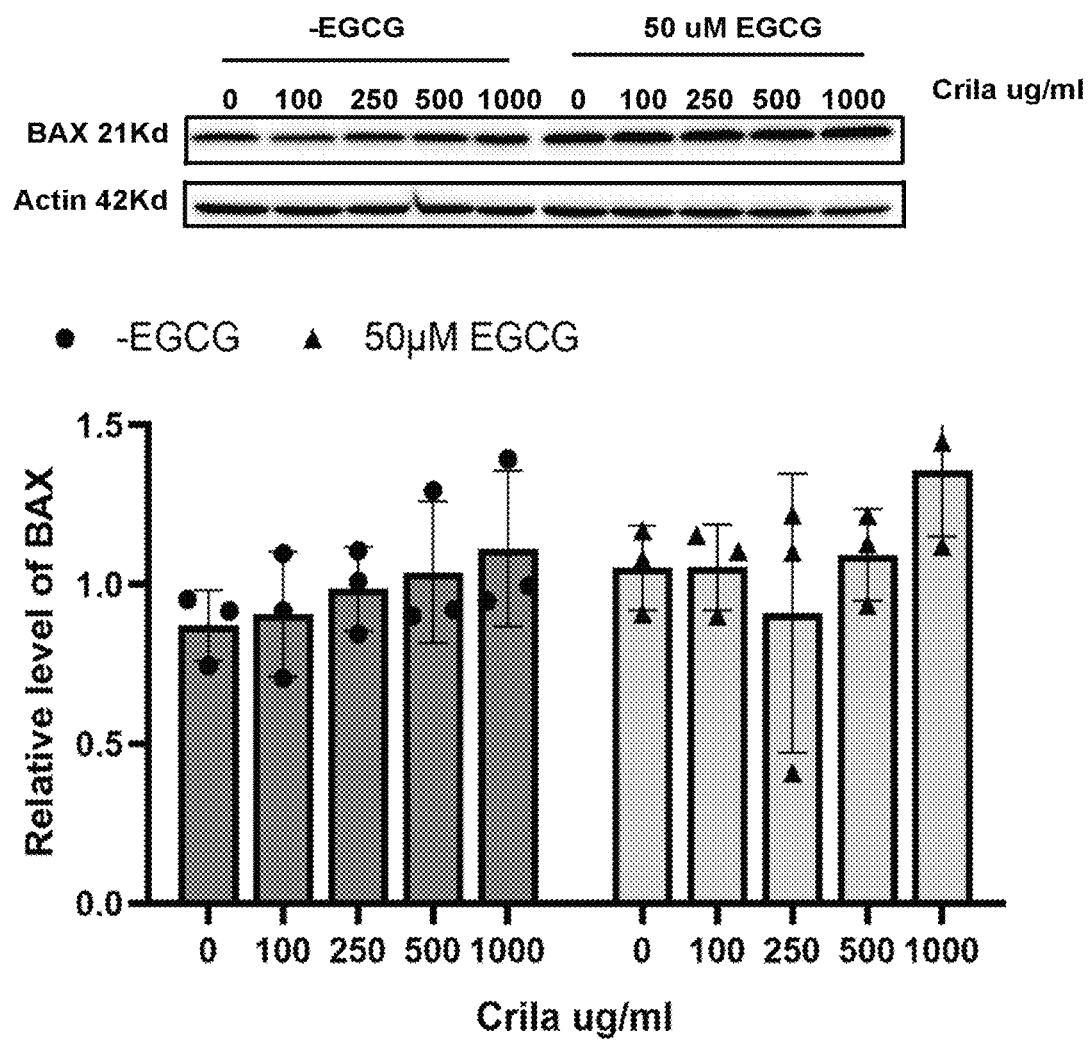
FIG. 10 is a representative result from western blotting analysis showed when combined with 50 µM EGCG, Crila® at concentrations from 100 to 250 µg/ml used in this study resulted in significant decrease in level of proliferation marker PCNA protein compared to single agent treatments.

We also tested both marker expressions at protein levels. As shown in the figures (FIG. 9 and FIG. 10) below, results from western blotting analysis showed when combined with 50 µM EGCG, Crila® at concentrations from 100 to 250 µg/ml used in this study resulted in significant decrease in level of proliferation marker PCNA protein compared to single agent treatments. This effect reached to maximum at this point since 500 and 1000 µg/ml of Crila® combined with 50 µM EGCG did not result in more significant PCNA protein decrease compared to those of Crila® alone. For BAX, neither the combinations of Crila® and 50 µM EGCG caused significant upregulation of BAX protein level compared to single agent treatments.

Based on these studies, a combination of Crila® and EGCG treatment depressed HuLM cell growth by decreased proliferation, not due to increased apoptosis. The real-time RT-PCR and western blot data confirmed these results.

Similarly, it is observed that a combination of the Crila® composition and EGCG treatment depresses HuLM cell growth by decreased proliferation. The real-time RT-PCR and western blot data may be used to confirm these results.

Material and Methods:

Preparation of Reagents: 250 mg of the dry Crila® powder was dissolved in 50 ml of cell culture media (DMEM/F12 containing 10% FBS) at room temperature with constant stirring for 1 hour. Thereafter, the extract was sterile filtered through 0.22 µm PES filter and stored at room temperature until further use. EGCG was dissolved in DMSO to make a 100 mM stock solution or in dH2O to make 10 mM stock solution.

Cell Proliferation Assay:

Cell proliferation assay was performed by dimethylthiazolyl diphenyltetrazolium bromide (MTT) assay.

Human uterine leiomyoma (HuLM) cells were cultured in DMEM/F12 containing 10% fetal bovine serum. HuLM cells were seeded at 3000 cells/well in 96-well plates and then treated with different concentrations for different time points as described in figures below, DMSO vehicle was added to control wells.

Samples were measured (from the treated wells and control wells) after 1 to 2 days, 3 days, 5 days and 7 days. Culture media were replaced after each 48 hours with fresh complete media. Relative cell viability was determined by using the MTT assay.

At each time point, cell supernatants were removed and 150 µl of 0.5 mg/ml MTT in PBS solution was added to each well and plates were incubated at 37° C. for 4 hours, aspirated and 200 µl of dimethyl sulfoxide (DMSO) was added to each well and agitated gently on shaker for 15 min to 1 hour until insoluble formazan dissolved in DMSO while protected from light. Absorbance was measured in Varioskan Lux microplate reader (ThermoFisher) at 570 nm.

Data is presented as % viability relative to control vehicle-only group of each drug or combined drugs at each time point. Individual data points are the mean+SEM of quadriplicate measurement. * p<0.05,  p<0.01 * p<0.001, **** p<0.0001.

Combination Index

For determination of the synergistic effects, different combinations of dose and time course of Crila® and EGCG were chosen based on the time course of single agent and combined treatments and combination index (CI) scores were calculated using the Chou-Talalay method and CompuSyn software. For this analysis, we entered the combination treatment data, along with the data obtained from previous single agent treatments, into CompuSyn to determine the CI value for each combination point. The CI value quantitatively defines antagonism (CI>1.5), additivity (1<CI<1.5) and synergy (CI<1), and the results are shown as the classic isobologram.

Western Blot Analysis:

Protein was collected after 48 hours of treatment and was extracted and lysed by sonication on ice in RIPA buffer (Sigma). Proteins were separated in SDS-PAGE and then transferred onto PVDF membranes (Bio-Rad). The membranes were blocked with 5% skim milk in TBS-T (150 mmol/L NaCl, 10 mmol/L TRIS, PH 7.6 and 0.1% TWEEN-20) at room temperature for 1 hour and then incubated with primary antibodies at 4° C. overnight. All the primary antibodies were obtained from Genetex and Abcam. The membranes were then washed with TBS-T for 10 minutes 3 times and incubated with appropriate HRP-conjugated secondary antibody at room temperature for 1 hour. The proteins were then measured using a ChemiDoc (Bio-Rad). Bands were quantified by using Fiji software.

Quantitative real-time PCR:

Total RNA was collected from cells after 48 hours of treatment and extracted using RNeasy Plus mini kit (Qiagen). cDNA was synthesized by SuperScript Reverse Transcriptase (Invitrogen) following the manufacturer's instructions. The expression level of target was detected using the SsoAdvanced SYBR Green supermix (Bio-Rad). Primers used in this study are shown in the below table. Data were obtained as Ct values and used to determine ΔCt values (Ct of target gene—Ct of housekeeping gene, GAPDH). These values were then used to generate mean ΔCt values±SD for each treatment, which were used in statistical comparisons. Visual representation of data was carried out by converting ΔCt values to fold change data relative to ΔCt values for control vehicle-only cells using the equation $2^{-\Delta\Delta Ct}$.

| Gene of target | | SEQ ID NO | Sequence |
|---|---|---|---|
| PCNA | forward 5'-3' | 1 | GCAAGTGGAGAACTTGGAAATG |
| | reverse 5'-3' | 2 | GCCTAAGATCCTTCTTCATCCTC |
| Bax | forward 5'-3' | 3 | CCCCCGAGAGGTCTTTTTCC |
| | reverse 5'-3' | 4 | TGTCCAGCCCATGATGGTTC |
| GAPDH | forward 5'-3' | 5 | GACAGTCAGCCGCATCTTCT |
| | reverse 5'-3' | 6 | GCGCCCAATACGACCAAATC |

Statistical analysis: Statistical analysis was performed by GraphPad Prism and data are expressed as the mean±SD. Means of more than two groups of data were compared using a two-way analysis of variance (ANOVA), followed by Tukey's. * p<0.05,  p<0.01 * p<0.001.

Figure 11:
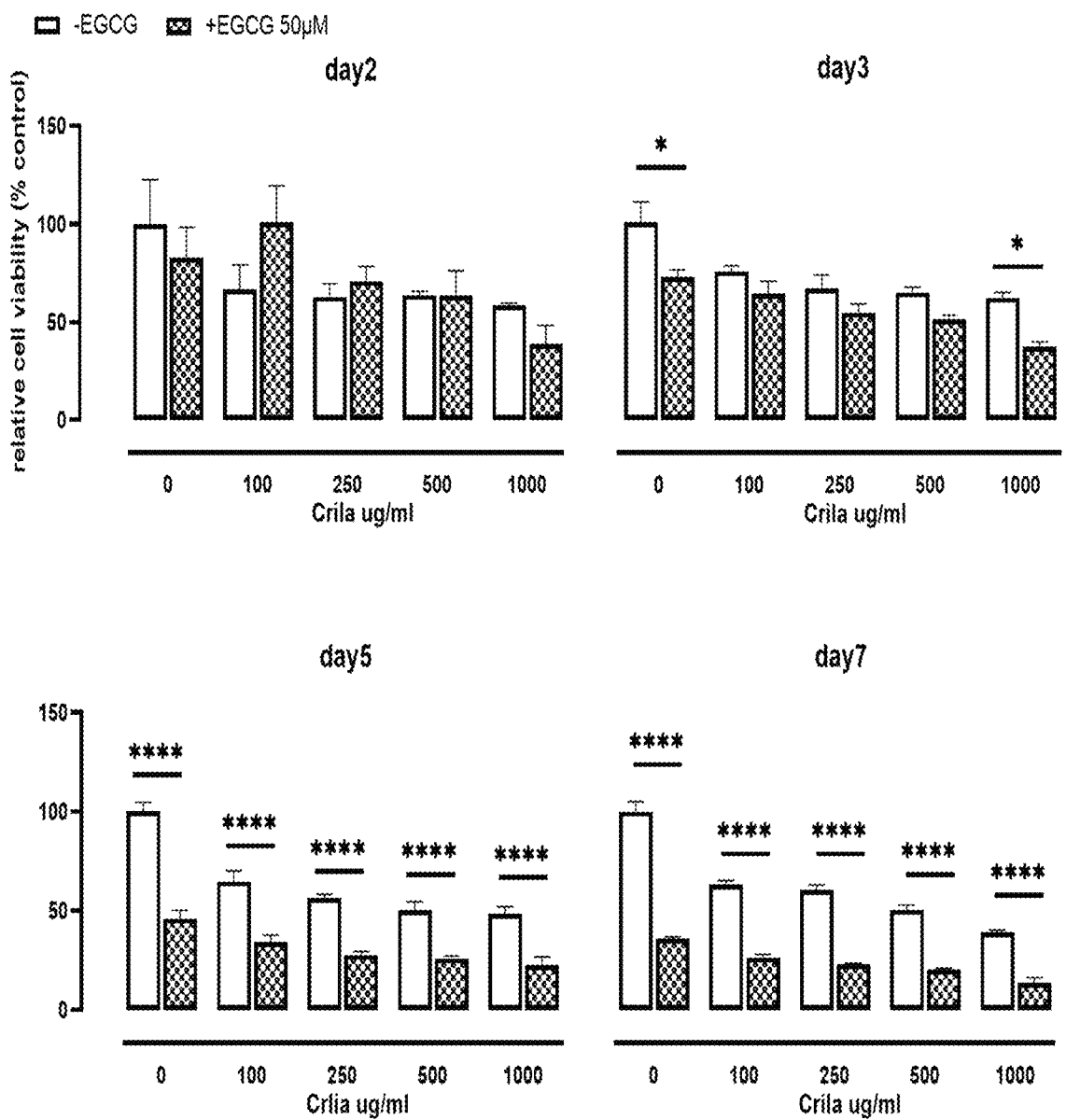
FIG. 11, Experiment 1, shows cell viability results of Crila® combined with 50 µM EGCG for 2 days, 3 days, 5 days and 7 days treatment from separate experiments.
Figure 12:
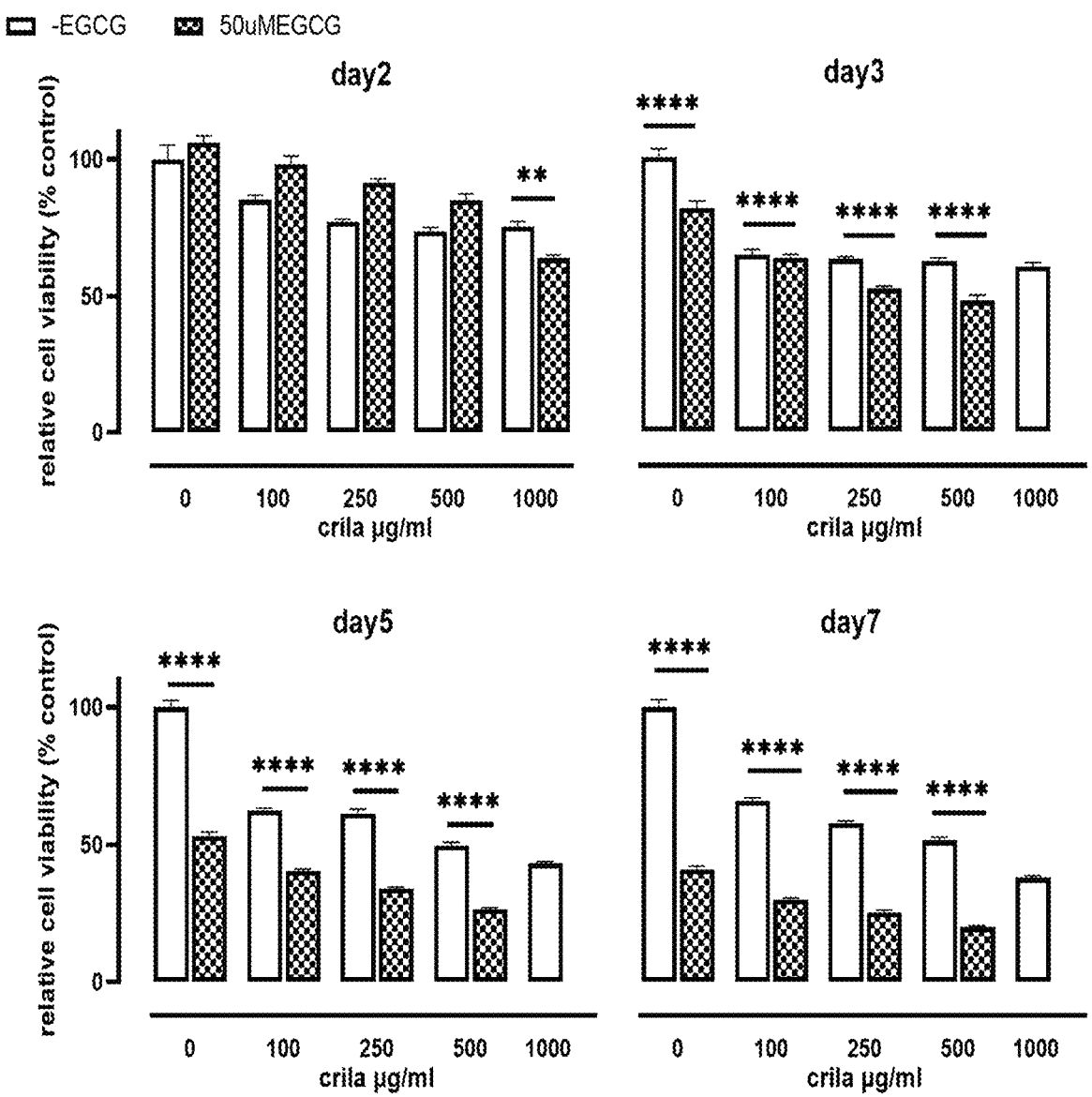
FIG. 12, Experiment 2, shows cell viability results of Crila® combined with 50 µM EGCG for 2 days, 3 days, 5 days and 7 days treatment from separate experiments.

Supplemental Data:

Cell viability results of Crila® combined with 50 µM EGCG for 2 days, 3 days, 5 days and 7 days treatment from separate experiments are shown in FIG. 11. The Y-axis shows relative cell viability to control vehicle-only treatment.

Figure 13:
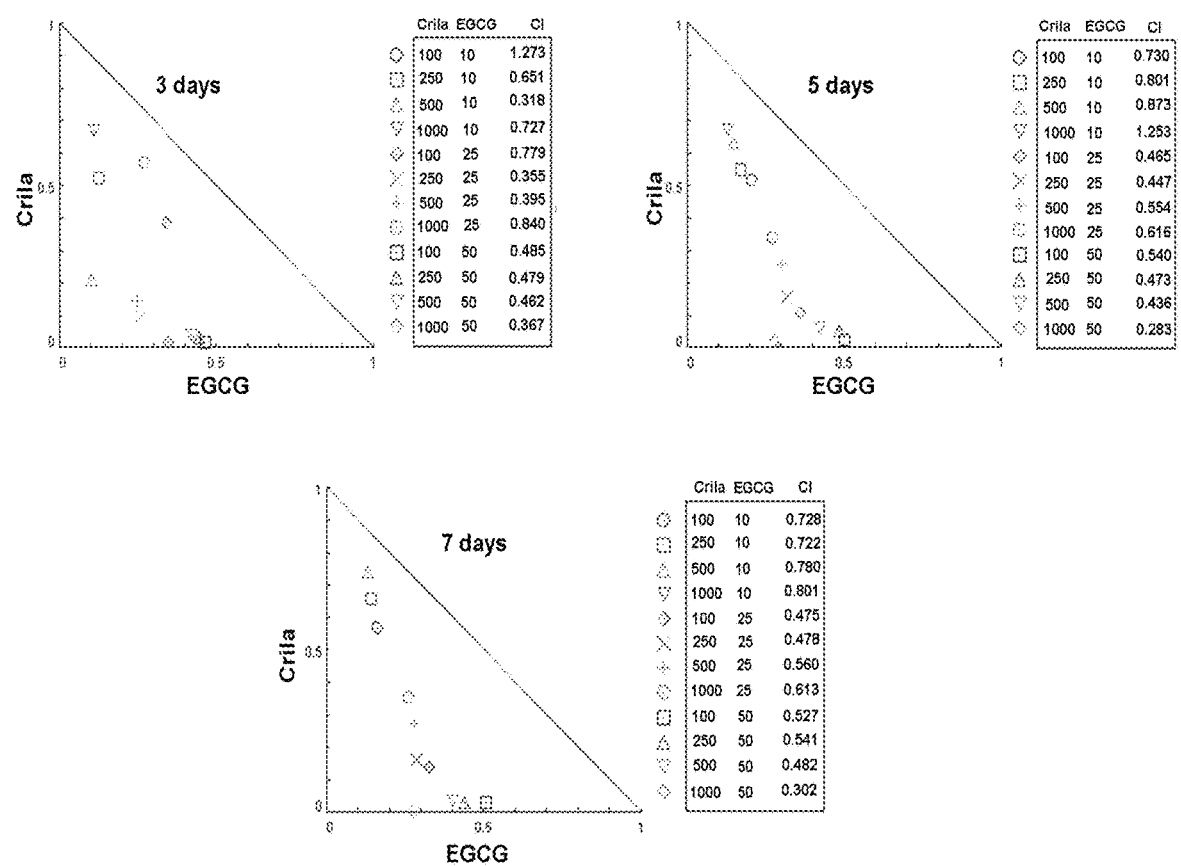
FIG. 13, Experiment 1, shows the synergistic effect results of Crila® and 10, 25 and 50 UM EGCG for 3 days, 5 days and 7 days treatment from separate experiments.
Figure 14:
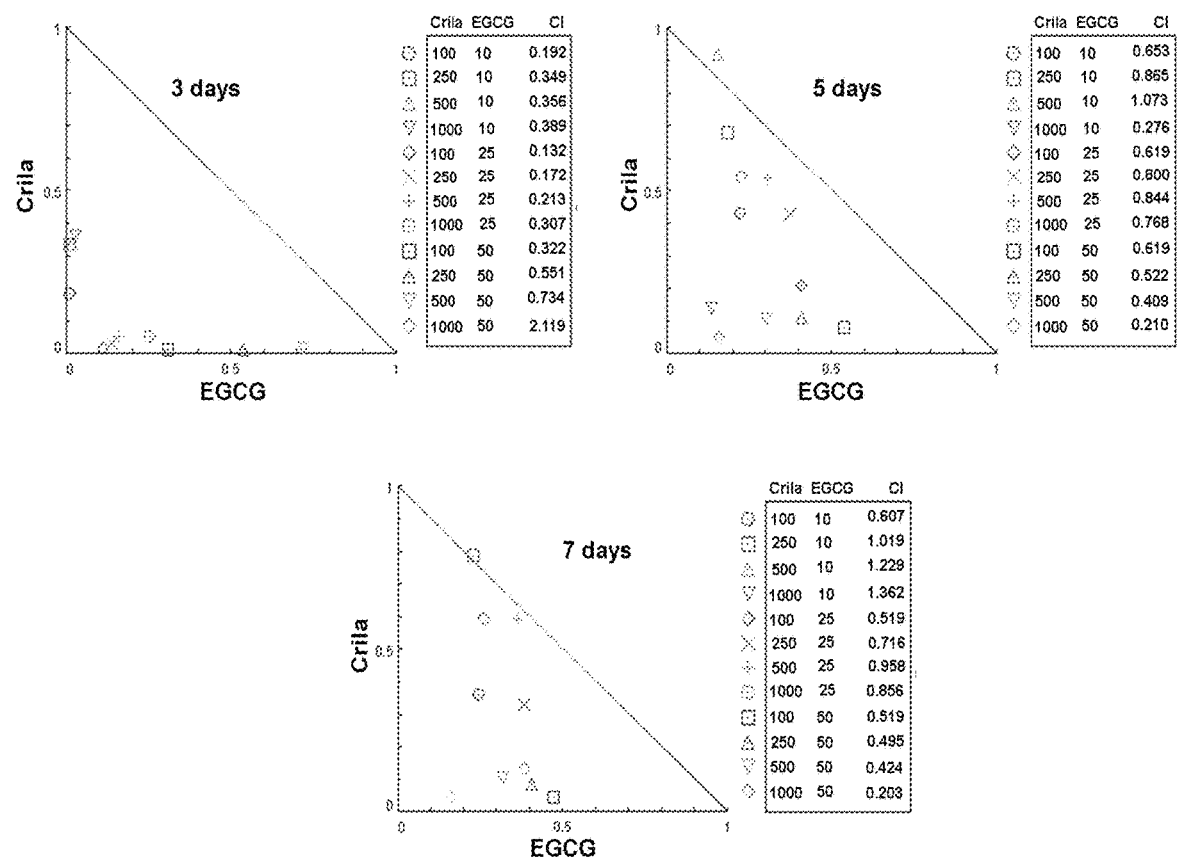
FIG. 14, Experiment 2, shows the synergistic effect results of Crila® and 10, 25 and 50 UM EGCG for 3 days, 5 days and 7 days treatment from separate experiments.

Synergistic effect results of Crila® and 10, 25 and 50 µM EGCG for 3 days, 5 days and 7 days treatment from separate experiments (FIG. 13 and FIG. 14) are shown. The combination index (CI) data corresponding to isobolograms are shown beside each isobologram, respectively.

In one embodiment, the present application discloses studies on cultured human leiomayoma cells and demonstrates that a composition comprising Crila® and EGCG, such as ABC-105 and ABC-205, a Crila® and EGCG combination formulations, show an unexpected synergistic effect in significantly reducing cell viability in patients with uterine fibroids. ABC-105 constitutes a composition comprising 920 mg Crila® and 400 mg EGCG formulated in a gel cap. ABC-205 constitutes a composition comprising 920 mg Crila® and 150 mg EGCG formulated in a gel cap.

Similarly, a Crila® composition and EGCG combination formulations, show an unexpected synergistic effect in significantly reducing cell viability in patients with uterine fibroids.

Prior to initiating a randomized, double-blind, placebo controlled multi-center, prospective, clinical trial of ABC-105/ABC-205 in women with uterine fibroids to evaluate change in size of UFs and their associated symptoms, a hepatic safety analysis must be conducted. Hepatic safety is of paramount concern as therapeutics targeting uterine fibroids, primarily biologics, often encounter issues with hepatic safety profiles. The hepatic safety of ABC, Crila® plus EGCG combinations, treatment is unknown. A 4-arm study may be conducted in women with fibroids to allow comparisons between these groups. The results of this study may be used to confirm hepatic safety for the larger multi-center ABC study.

Results: The treatment of patients having various stages, levels and size of uterine fibroids over a period of 30 days result in a reduction of size of the uterine fibroids by a range of 10% to 30%. In some studies, it is observed that the treatment of patients having various sizes of uterine fibroids over a period of 60 days result in a reduction of size of the uterine fibroids by a range of 10% to 50%. Furthermore, it is observed that the treatment of patients having various sizes of uterine fibroids over a period of 90 days result in a reduction of size of the uterine fibroids by a range of 50% to more than 90%.

While a number of exemplary embodiments, aspects and variations have been provided herein, those of skill in the art will recognize certain modifications, permutations, additions and combinations and certain sub-combinations of the embodiments, aspects and variations. It is intended that the following claims are interpreted to include all such modifications, permutations, additions and combinations and certain sub-combinations of the embodiments, aspects and variations are within their scope.

The entire disclosures of all documents cited throughout this application are incorporated herein by reference.

What is claimed is:

1. A composition comprising an aqueous solution comprising *Crinum latifolium* L. var. crilae Tram & Khanh cultivar dry extract in a concentration between 100 pg/mL and 1000 pg/mL and epigallocatechin gallate (EGCG) in a concentration between 10 pM and 50 pM.

2. The composition of claim 1, wherein the solution of the *Crinum latifolium* L. var. crilae Tram & Khanh cultivar dry extract is present in a concentration between 100 μg/mL-250 μg/mL.

3. The composition of claim 1, wherein the EGCG in the composition is present in a concentration between 10 μM-25 μM.

4. The composition of claim 1, wherein: the solution of the *Crinum latifolium* L. var. crilae Tram & Khanh cultivar dry extract is present in a concentration selected from 100 μg/mL, 250 μg/mL, 500 μg/mL, or 1000 μg/mL; and EGCG is present in a concentration selected from 10 μM, 25 μM, or 50 μM.

5. The composition of claim 1, wherein the solution of the *Crinum latifolium* L. var. crilae Tram & Khanh cultivar dry extract is present in a concentration between 250 μg/mL and 500 μg/mL.

6. The composition of claim 1, wherein the solution of the *Crinum latifolium* L. var. crilae Tram & Khanh cultivar dry extract is present in a concentration between 500 μg/mL and 1000 μg/mL.

7. The composition of claim 1, wherein the solution of the *Crinum latifolium* L. var. crilae Tram & Khanh cultivar dry extract is present in a concentration between 100 μg/mL and 500 μg/mL.

8. The composition of claim 1, wherein the solution of the *Crinum latifolium* L. var. crilae Tram & Khanh cultivar dry extract is present in a concentration between 250 μg/mL and 1000 μg/mL.

9. The composition of claim 1, wherein the EGCG in the composition is present in a concentration between 25 μM and 50 μM.

* * * * *